(12) United States Patent
Sheikhi et al.

(10) Patent No.: US 12,458,728 B2
(45) Date of Patent: Nov. 4, 2025

(54) TOUGH TISSUE SEALANTS AND THE USE THEREOF

(71) Applicant: The Regents of the University of California, Oakland, CA (US)

(72) Inventors: Amir Sheikhi, State College, PA (US); Maryam Tavafoghi, Los Angeles, CA (US); Alireza Khademhosseini, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 228 days.

(21) Appl. No.: 17/772,399

(22) PCT Filed: Nov. 18, 2020

(86) PCT No.: PCT/US2020/061040
§ 371 (c)(1),
(2) Date: Apr. 27, 2022

(87) PCT Pub. No.: WO2021/101983
PCT Pub. Date: May 27, 2021

(65) Prior Publication Data
US 2022/0378975 A1 Dec. 1, 2022

Related U.S. Application Data

(60) Provisional application No. 62/936,808, filed on Nov. 18, 2019.

(51) Int. Cl.
| A61L 24/04 | (2006.01) |
| A61L 24/00 | (2006.01) |
| C08L 5/04  | (2006.01) |
| C08L 89/06 | (2006.01) |

(52) U.S. Cl.
CPC .......... *A61L 24/043* (2013.01); *A61L 24/0015* (2013.01); *C08L 5/04* (2013.01); *C08L 89/06* (2013.01); *A61L 2400/04* (2013.01)

(58) Field of Classification Search
CPC ............... A61L 24/043; A61L 24/0015; A61L 2400/04; C08L 5/04; C08L 89/06
See application file for complete search history.

(56) References Cited

U.S. PATENT DOCUMENTS

| 2006/0233850 A1* | 10/2006 | Michal ................ A61L 27/3804 424/422 |
| 2008/0220047 A1 | 9/2008 | Sawhney et al. |
| 2019/0002836 A1 | 1/2019 | Marquette et al. |

FOREIGN PATENT DOCUMENTS

| CN | 107050510 | 8/2017 |

OTHER PUBLICATIONS

Noshad et al. (Biomater. Sci. (2017) 5(10); 2093-2105).*
Annabi et al., "Engineering a highly elastic human protein-based sealant for surgical applications". Sci. Transl. Med. 9 (2017), 14 pages.
Assmann et al., "A highly adhesive and naturally derived sealant". Biomaterials. 115 (2017), 30 pages.
Li et al. , "Tough adhesives for diverse wet surfaces". Science. 357 (2017), 11 pages.
Sun et al., "Highly stretchable and tough hydrogels". Nature. 489 (2012), 10 pages.
PCT International Search Report & Written Opinion dated Mar. 18, 2021 for PCT Application No. PCT/US20/61040.
Extended European Search Report dated Feb. 15, 2024 for European Patent Application No. 20891383.0.
Zhang, X., et al., "Marine Biomaterial-Based Bioinks for Generating 3D Printed Tissue Constructs", Marine Drugs, Dec. 2018, pp. 1-13, vol. 16, No. 12.
Majidi, S.S., et al., "Wet electrospun alginate/gelatin hydrogel nanofibers for 3D cell culture", International Journal of Biological Macromolecules, 2018, pp. 1648-1654, vol. 118.
Ahadian, S., et al., "Bioconjugated Hydrogels for Tissue Engineering and Regenerative Medicine", Bioconjugate Chemistry, Oct. 2015, pp. 1984-2001, vol. 26, No. 10.
Annabi, N., et al., "25th Anniversary Article: Rational Design and Applications of Hydrogels in Regenerative Medicine", Advanced Materials, Nov. 2014, pp. 85-124, vol. 26, No. 1.
Ashammakhi, N., et al., "Bioinks and bioprinting technologies to make heterogeneous and biomimetic tissue", constructs, Materials Today Bio, Jan. 2019, pp. 1-23, vol. 1.
Guan, X., et al., "Development of hydrogels for regenerative engineering", Biotechnology Journal, Feb. 2017, pp. 1-20, vol. 12, No. 5.

* cited by examiner

*Primary Examiner* — Shirley V Gembeh
(74) *Attorney, Agent, or Firm* — Buchanan Ingersoll & Rooney PC

(57) ABSTRACT

The invention provides injectable, tough hydrogels that can be crosslinked in situ on demand using minimally-invasive methods, such as visible light exposure is an unmet medical challenge. Among the emerging biopolymers for tissue sealing, gelatin methacryloyl (GelMA), a naturally-derived biopolymer obtained from denatured collagen, has secured a promising role as a result of its excellent bioadhesion, biodegradation, and biocompatibility. To overcome one of the main shortcomings of GelMA, i.e., brittleness, we hybridized it using methacrylate-modified alginate (AlgMA) to impart ion-induced reversible crosslinking that can dissipate energy under strain. The hybrid GelMA-AlgMA hydrogels provide a photocrosslinkable, injectable, and adhesive platform with an excellent toughness that can be engineered using divalent cations, such as calcium. This class of novel hybrid biopolymers with more than 600% improved toughness may set the stage for durable, mechanically-resilient, and cost-effective tissue sealants in minimally invasive procedure, especially for stretchable tissues.

20 Claims, 9 Drawing Sheets

TOUGH TISSUE SEALANTS AND THE USE THEREOF

CROSS REFERENCE TO RELATED APPLICATIONS

This application claims the benefit under 35 U.S.C. Section 119(e) of co-pending and commonly-assigned U.S. Provisional Patent Application Ser. No. 62/936,808, filed on Nov. 18, 2019 and entitled "TOUGH TISSUE SEALANTS AND THE USE THEREOF" which application is incorporated by reference herein.

STATEMENT OF GOVERNMENT INTEREST

This invention was made with government support under Grant Numbers HL140618 and EB023052, awarded by the National Institutes of Health. The government has certain rights in the invention.

TECHNICAL FIELD

The present invention relates to tissue sealants and methods for making and using them.

BACKGROUND OF THE INVENTION

Minimally-invasive sealing of injured tissues and organs is of utmost importance in biomedicine (1-7). The global market for hemostats and tissue sealants was more than $4.6 billion in 2017, which is expected to grow beyond $10 billion by 2027 (8). The integration of sealant biomaterial with tissues undergoing extensive daily activities, such as stretching and contraction, is an unmet clinical need that requires stretchable and biocompatible material platforms. Various tissue injuries, such as skin and muscle laceration and burn (9-11), cardiac trauma (12), lung puncture (13-18), liver bleeding (19), cornea (20,21), and teeth and gum injuries (22-26) as well the anastomosis of tubular tissues (27-30) have been treated with tissue adhesive biomaterials to leverage a regenerative microenvironment while providing a physical support.

Organs that naturally undergo dynamic shape change, such as lung, heart, and bladder are extremely challenging to seal using an adhesive biomaterial. A suitable adhesive should adhere well to the wet tissue and adapt to the external mechanical stimuli that are often cyclic. Despite significant advances in developing elastic hydrogels, the majority of bioadhesive hydrogels undergo rupture due to brittleness and fracture energy (e.g., in the order of 10 J/m2) almost two orders of magnitude lower than that of soft tissues (31-37). To address this challenge, some efforts have been devoted to design stretchable bioadhesives based on crosslinkable biomaterials. Tough hydrogels that can dissipate energy and undergo plastic deformation have been engineered using a double/multi-network hydrogels (38-43). As an example, polyacrylamide has been mixed with alginate to increase the toughness of pristine polymer (31,44) via the synergistic contribution of ionically-crosslinkable alginate with covalently crosslinked polyacrylamide. The physical crosslinking of alginate inside the chemically-crosslinked polyacrylamide enabled the hydrogels to stretch beyond 20 times their initial length and provided a fracture energy of ~9000 J/m2. The improved mechanical properties of the hybrid hydrogels have been attributed to the synergy between two mechanisms: (i) crack bridging by the covalent network and (ii) energy dissipation by the secondary, often physical network permitting reversible bond breakage. The covalent crosslinking maintains the physical state of the hydrogels while the physically-formed, reversible network dissipates the external energy, protecting the scaffold from permanent mechanical damage. As polyacrylamide-based tough hydrogels do not typically adhere well to tissues, surface modifications are necessary after crosslinking these hydrogels (44).

Another class of elastic and biodegradable sealants based on chemically-modified tropoelastin (MeTro), a recombinant human protein, has been developed recently (18). Although these hydrogels had lower mechanical strength and elasticity compared to some of the double-network hydrogels, they exhibited higher tissue adhesion and elasticity compared to the commercially available sealants, such as Evicel®, Coseal®, and Progel®. Standard wound closure experiments showed that MeTro (20% w/v) can be stretched 2 times its initial length before breaking, providing a tissue adhesive hydrogel that could seal defected sites on elastic tissues, such as lung and blood vessels, in vivo. The extremely high production cost of MeTro has significantly limited its translation for clinical applications.

Accordingly, there is currently a significant medical need for bioadhesive, biodegradable and tough tissue sealants that can be produced at a relatively low cost, preferably from naturally-derived, biodegradable materials.

SUMMARY OF THE INVENTION

As discussed in detail below, a tough and stretchable adhesive capable of sealing highly dynamic elastic tissues undergoing extensive cyclic forces has been developed. The type of material disclosed herein is particularly important to the field of sutureless tissue sealing because conventional commercially available adhesives lack the extent of stretchability and mechanical strength needed for a variety of biomedical applications. To illustrate the applicability of this novel technology, we describe how this adhesive hydrogel can be used for the sealing of a variety of stretchable tissues, such as bladder, ureter, heart, lung and the like. In addition, strategies to improve the mechanical robustness of hydrogels that are disclosed herein can be further extended to other adhesive polymers with similar reactive moieties.

Embodiments of the invention include an adhesive double network hybrid hydrogel made up of two naturally-derived biopolymers, methacryloyl-modified gelatin (GelMA) and alginate (AlgMA). In embodiments of the invention, the hydrogel can be covalently crosslinked, for example with visible light, followed by an ionic crosslinking with a divalent ion, e.g., calcium ion. The resultant compositions comprise a robust network of hydrogels having the capability to dissipate energy through the reversible ionic crosslinks formed between AlgMA, while providing a high mechanical strength owing to the covalent bonds between AlgMA and GelMA.

In illustrative embodiments of the invention, a hydrogel formulation containing 20% w/v GelMA and 2-3% w/v AlgMA, is shown to exhibit a stretchability up to 100% and fracture toughness of ~35 kJ/m3, mechanical properties which are approximately 4 times higher than those for the pure GelMA. Under compression, the pure GelMA broke at a compressive stress as low as 200 kPa while the hybrid gel withstood a 1500 kPa stress (FIG. 2). The mechanical properties obtained here are among the highest reported so far for the biodegradable hydrogels considering that the GelMA/AlgMA system also possesses tissue adhesion properties.

The ex vivo sealing properties of a working embodiment of the hybrid hydrogels disclosed herein were evaluated using bladder and ureter models. The burst pressure of the hybrid hydrogel for sealing a perforated bladder was 5 kPa (vs 2 kPa for GelMA), and its strength to connect an anastomosed ureter was 90 kPa (vs 20 kPa for GelMA) (FIG. 5). To our knowledge, this is the first discovery of an ionic-covalent double-network (DN) hydrogel with tissue sealing properties and biodegradability, making this hydrogel particularly interesting for applications in tissue engineering and regenerative medicine.

The invention disclosed herein has a number of embodiments. For example, embodiments of the invention include biocompatible compositions of matter comprising alginate and gelatin. Typically, in these compositions, the alginate and/or gelatin comprise crosslinkable or crosslinked moieties such as vinyl groups or the like, the alginate and gelatin are chemically crosslinked together; and the alginate comprises reversible ionic crosslinks. In certain embodiments of the invention, the compositions comprise additional agents such as a divalent ion (e.g. $Ca^{++}$), a crosslinking photoinitiator agent, a pharmaceutical excipient such as one selected from the group consisting of a preservative, a tonicity adjusting agent, a detergent, a viscosity adjusting agent, a sugar and a pH adjusting agent, and/or a therapeutic agent. In certain embodiments of the invention, the amounts or ratios of one or more constituents is controlled in order to, for example, control one or more material properties of the compositions. For example, in certain embodiments, the composition comprises a divalent ion (e.g. $Ca^{++}$) and not more than 3% alginate (w/v). Optionally, for example, the composition comprises from 10% to 30% gelatin (w/v), and from 1% to 3% alginate (w/v). In illustrative embodiments of the invention, the amounts or ratios of one or more constituents in the composition is controlled so that the composition exhibits a tensile strength of at least 60 kPa, and/or exhibits a toughness of at least 15 $kJ/m^3$; and/or exhibits a tensile strain of at least 0.6 mm/mm.

Other embodiments of the invention include methods of making a composition disclosed herein, for example by combining together alginate and gelatin and a divalent ion (e.g. $Ca^{++}$), and optionally a crosslinking initiating agent, a pharmaceutical excipient and/or a therapeutic agent so as to form the composition. In certain embodiments of these methods, relative amounts of alginate and gelatin are selected so that the composition exhibits a tensile strength of at least 60 kPa, and/or exhibits a toughness of at least 15 $kJ/m^3$; and/or exhibits a tensile strain of at least 0.6 mm/mm.

Other embodiments of the invention include methods of delivering a composition disclosed herein to a preselected site, the methods comprising disposing the composition at the site and then crosslinking the composition in situ. Typically in these methods, the site is an in vivo site such as an in vivo location where an individual has experienced trauma or injury. In illustrative embodiments of these methods, the site comprises vascular, bladder, lung or heart tissue.

The novel compositions and methods for making and using them that are disclosed herein have a number of advantages over conventional issue sealing compositions. Advantages include the fine tuning of stretchability and sealing properties of hydrogels without significantly changing their biodegradation, swelling, and other physical properties pertinent to successful clinical translation. Advantages also include increasing the tissue sealing strength of naturally-derived hydrogels beyond the commercially available sealants using facile double networks. Advantages also include preserving the suitable properties of naturally-derived hydrogels (e.g., biodegradation) while improving the stretchability, toughness, and sealing properties. Advantages also include providing tough tissue adhesive hydrogels for a broad range of applications in tissue engineering and regeneration Other objects, features and advantages of the present invention will become apparent to those skilled in the art from the following detailed description. It is to be understood, however, that the detailed description and specific examples, while indicating some embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

FIG. 2($a$) shows images of the hybrid hydrogels containing 0% and 2% (w/v) AlgMA undergoing stretching. FIG. 2($b$) shows representative tensile stress-strain curves, while FIG. 2($c$) shows tensile strain at break, FIG. 2($d$) shows Young's modulus, FIG. 2($e$) shows tensile strength, and FIG. 2($f$) shows toughness for the hybrid hydrogels containing varying concentrations of AlgMA. FIG. 2($g$) shows images of the hybrid hydrogels undergoing compression, and FIG. 2($h$) shows representative compressive stress-strain curves, FIG. 2($i$) shows compressive strength, FIG. 2($j$) shows compressive modulus, FIG. 2($k$) shows cyclic compressive stress-strain curves, and FIG. 2($l$) shows energy loss for the hybrid hydrogels. FIG. 2($m$) shows storage modulus, FIG. 2($n$) shows loss modulus, and FIG. 2($o$) shows loss factor at angular frequency=1 rad/s and strain=0.1% for the hybrid hydrogels. Asterisks show the results that are statically significant with p-values<0.05 (*), 0.01 (), 0.001 (*), or 0.0001 (****).

FIGS. 3A-3D. Physical properties of hybrid hydrogels composed of GelMA (20% w/v) and varying concentrations of AlgMA. FIG. 3($b$) shows the swelling ratio of the hydrogels after 4 h incubation in DPBS. FIG. 3($c$) shows time-dependent degradation of the hydrogels immersed in DPBS containing collagenase (1.25 U/mL) at 37° C. FIG. 3($d$) shows the degradation of hydrogels after 5 weeks of incubation in DPBS containing collagenase (1.25 U/mL) at 37° C. Asterisks show the results that are statically significant with p-values<0.05 (*), 0.01 (), 0.001 (*), or 0.0001 (****).

FIG. 4(a) shows images showing the burst pressure assessment of double-network hybrid hydrogels prepared via successive photochemical and ion-mediate crosslinking, FIG. 4(b) shows representative pressure-time curves obtained from the burst pressure tests, and FIG. 4(c) shows the burst pressure values of hybrid hydrogels containing varying AlgMA concentrations. FIG. 4(d) shows Wound closure assessment setup, FIG. 4(e) shows representative stress-strain curves from wound closure experiments, FIG. 4(f) shows the wound closure strength of hybrid hydrogels, and FIG. 4(g) shows the adhesion energy of hybrid hydrogels. Asterisks show the results that are statically significant with p-values less than 0.05 (*), 0.01 (), 0.001 (*), or 0.0001 (****).

FIGS. 5A-5F. Ex vivo sealing capability of hybrid hydrogels composed of GelMA (20% w/v) and varying concentrations of AlgMA. FIG. 5(a) shows photos from a porcine bladder incision model: images show (a, i) a healthy porcine bladder, (a, ii) a superficial wound created in the bladder before sealing, FIG. 5(a, iii): the wound covered with the hydrogel, FIG. 5(a, iv): the subsequent crosslinking of hydrogel with visible light and FIG. 5(a, v): with a $CaCl_2$ solution, and FIG. 5(a, vi): the sealed bladder filled with water at pressure ~6 kPa. FIG. 5(b) shows the burst pressure of bioadhesive hybrid sealants at varying AlgMA concentrations. FIG. 5(c) shows a Porcine ureter anastomosis model: FIG. 5(c, i-iii) show images illustrating the method used for sealing a fully torn porcine ureter, followed by FIG. 5(d) stretching the tissue to test the wound closure capability of the bioadhesive. FIG. 5(e) shows representative tensile stress-strain curves and some examples of bioadhesive failure modes during the anastomosis tensile tests. Anastomosis strength of hybrid sealants at varying AlgMA concentrations is shown in FIG. 5(f). Asterisks show the results that are statically significant with p-values<0.05 (*) or 0.01 (**).

FIGS. 7(a) and 7(b) show the storage modulus; and FIG. 7(b) and FIG. 7(d) show loss modulus versus oscillatory shear strain (at angular frequency ~1 rad $s^{-1}$) and angular frequency (at oscillatory shear strain ~0.1%) for the hybrid hydrogels composed of GelMA (20% w/v) and varying concentrations of AlgMA.

FIG. 8(a) shows tensile strain at break and FIG. 8(b) shows tensile strength at break, FIG. 8(c) shows Young's modulus, FIG. 8(d) shows toughness, FIG. 8(e) shows wound closure strength, and FIG. 8(f) shows burst pressure of GelMA 20% compared to GelMA 25% showing no significant difference. FIG. 8(g) shows burst pressure of alginate (5%) compared to crosslinked AlgMA (5%). FIG. 8(h) shows burst pressure of hybrid hydrogels made up of GelMA (25%) and varying concentrations of alginate.

DETAILED DESCRIPTION OF THE INVENTION

Figure 1:
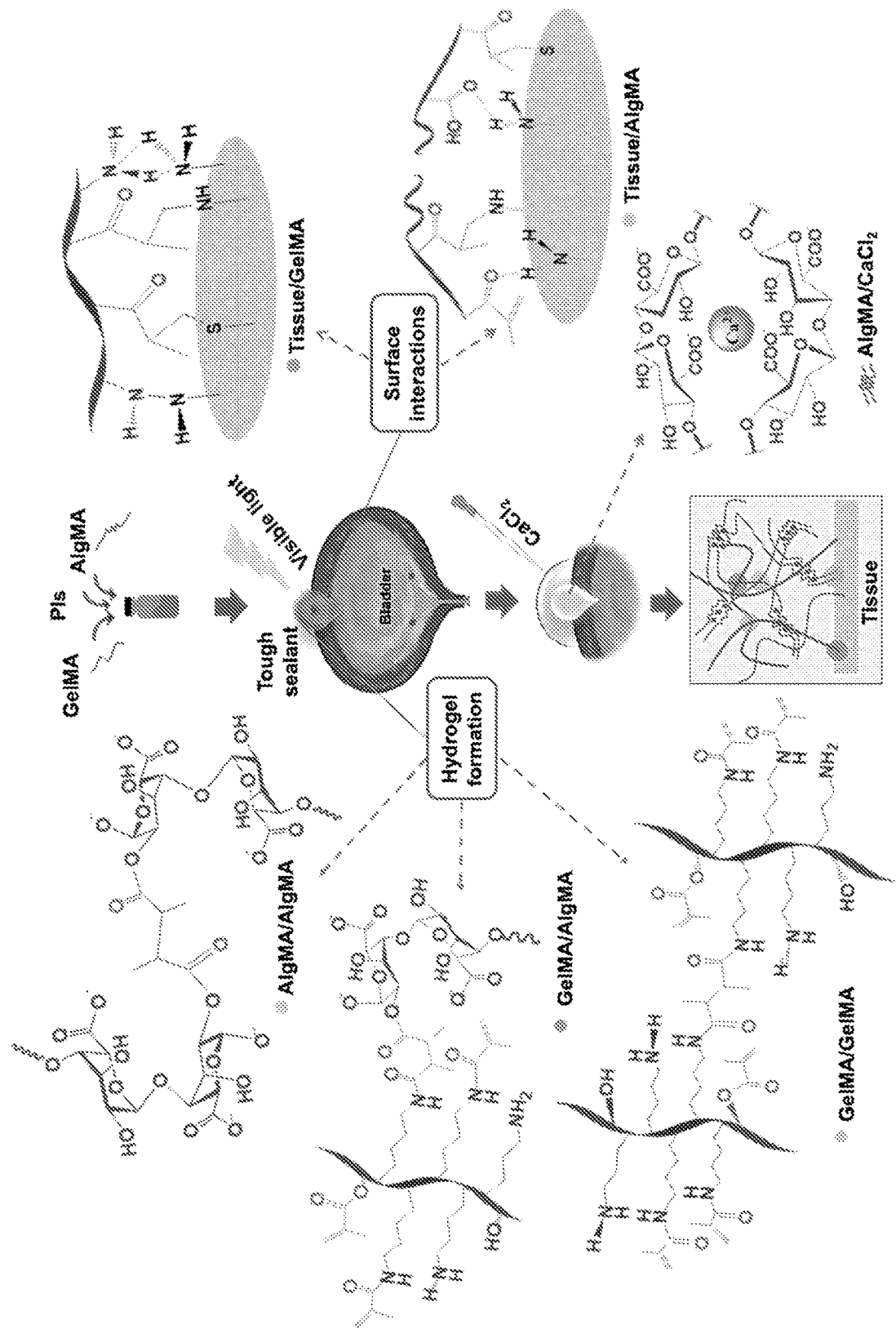
FIG. 1. Schematic of a GelMA-AlgMA hybrid hydrogel undergoing photo/ionic crosslinking and tissue adhesion. As shown in this schematic, both AlgMA and GelMA undergo covalent crosslinking through the photo-initiated polymerization of methacrylate/methacryloyl (MA) groups. In AlgMA, the G blocks on the polymer chains form ionic bonds with $Ca^{2+}$, providing a reversibly crosslinked network. Crosslinking hybrid GelMA/AlgMA hydrogels yields two types of polymer networks intertwined and connected by covalent bonds (via MA groups) supplemented by the $Ca^{2+}$-mediated physical bonds of AlgMA. GelMA may interact with amine-rich biological tissues through the formation of hydrogen bonds as well as covalent bonding of amine-MA and thiol-MA groups. AlgMA can interact with the tissue via hydrogen bonding, covalent bonding, and/or electrostatic interactions between the carboxylate and amino groups.

In the description of embodiments, reference may be made to the accompanying figures which form a part hereof, and in which is shown by way of illustration a specific embodiment in which the invention may be practiced. It is to be understood that other embodiments may be utilized, and structural changes may be made without departing from the scope of the present invention. Unless otherwise defined, all terms of art, notations and other scientific terms or terminology used herein are intended to have the meanings commonly understood by those of skill in the art to which this invention pertains. In some cases, terms with commonly understood meanings are defined herein for clarity and/or for ready reference, and the inclusion of such definitions herein should not necessarily be construed to represent a substantial difference over what is generally understood in the art. Many of the aspects of the techniques and procedures described or referenced herein are well understood and commonly employed by those skilled in the art. The following text discusses various embodiments of the invention.

Illustrative Materials and Methods of the Invention

As discussed in detail below, we have developed a tough, cost-effective, biodegradable, bioadhesive, and injectable hydrogel based on naturally-derived, biocompatible materials. We have designed a hybrid hydrogel based on gelatin and alginate, two of the most clinically-used biomaterials, functionalized with vinyl groups and evaluate their capability in sealing highly-stretchable tissues. We show how methacrylate-modified alginate (AlgMA) contributes to the formation of an energy dissipating ionic network while providing covalent bonding with gelatin methacryloyl (GelMA), imparting unique mechanical properties to the adhesive hybrid hydrogel. We detail how this platform paves the way for developing a new class of superior injectable bioadhesives possessing tissue adhesion and toughness.

The invention disclosed herein has a number of embodiments. For example, embodiments of the invention include biocompatible compositions of matter comprising alginate and gelatin. Typically in these compositions, the alginate and/or gelatin comprise crosslinkable or crosslinked moieties such as vinyl groups or the like, and/or the alginate and gelatin are chemically crosslinked together; and/or the alginate comprises reversible ionic crosslinks. The compositions of the invention can include additional constituents such as divalent ions (e.g. $Ca^{++}$ or the like in concentrations sufficient to facilitate ionic crosslinking), crosslinking initiating compounds, additional polymers, excipients, therapeutic agents and the like. For example, compositions of the invention can include one or more Food and Drug Administration (FDA) approved or cytocompatible polymers. Such polymers include chitosan, collagen, hyaluronic acid (HA), chondroitin sulfate (ChS), dextrin, gelatin, fibrin, peptide, and silk. Synthetic polymers such as poly(ethylene glycol) (PEG), poly(ethylene oxide) (PEO), poloxamer (Pluronic®) (PEO-PPO-PEO), polyoxamine (Tetronic®) (PEO-PPO), poly(vinyl alcohol) (PVA), poly(lactic-co-glycolic acid) (PLGA), poly(glycolic acid) (PGA), poly(lactic acid) (PLA), polycaprolactone (PCL), poly(L-glutamic acid) (PLga), polyanhydrides, poly(N-isopropylacrylamide) (PNIPAAm), polyaniline and the like can also be included in compositions of the invention. As is known in the art, preparations of hydrogels can be made to include either chemically or physically crosslinked materials.

Certain embodiments of the compositions of the invention include, for example a pharmaceutical excipient such as one selected from the group consisting of a preservative, a tonicity adjusting agent, a detergent, a viscosity adjusting agent, a sugar and a pH adjusting agent. For compositions suitable for administration to humans, the term "excipient" is meant to include, but is not limited to, those ingredients described in Remington: The Science and Practice of Pharmacy, Lippincott Williams & Wilkins, 21st ed. (2006) the contents of which are incorporated by reference herein.

In typical embodiments of the invention, the compositions of the invention include additional constituents such as divalent ions (e.g. $Ca^{++}$ or the like in concentrations sufficient to facilitate ionic crosslinking within the composition). In certain embodiments the compositions of the invention include one or more therapeutic agents such as an anti-inflammatory agent, an agent that modulates coagulation, an antibiotic agent, a chemotherapeutic agent or the like. Compositions of the invention can be formulated for use as carriers or scaffolds of therapeutic agents such as drugs, cells, proteins, and other bioactive molecules.

As carriers, compositions of the invention can incorporate the agents and deliver them to a desired site in the body for the treatments of a variety of pathological conditions. These include, for example, infectious and inflammatory diseases (e.g. Parkinson's disease, bacterial and antimicrobial infection, diabetes and the like) as well as cancers (e.g. colon, lung, breast, ovarian, lymphoma cancers and the like). In addition, as scaffolds, compositions of the invention can provide a flexible dwelling space for cells and other agents for use in tissue repair and the regeneration of desired tissues (e.g. for cartilage, bone, retina, brain, and, neural tissue repair, vascular regeneration, wound healing and the like). Moreover, embodiments of the invention can include immunomodulatory agents useful for immunotherapy in order to, for example, enhance components of the immune system. Certain illustrative materials and methods that can be adapted for use in such embodiments of the invention are found, for example in Hydrogels: Design, Synthesis and Application in Drug Delivery and Regenerative Medicine 1st Edition, Singh, Laverty and Donnelly Eds; and Hydrogels in Biology and Medicine (Polymer Science and Technology) UK ed. Edition by J. Michalek et al.

In certain embodiments of the invention, the amounts or ratios of one or more constituents is controlled in order to, for example, control one or more material properties of the compositions. For example, in certain embodiments, the compositions of the invention include divalent ions (e.g. $Ca^{++}$ or the like) in concentrations sufficient to facilitate ionic crosslinking within the compositions. In some embodiments of the invention, the compositions comprise not more than 3% alginate (w/v). Optionally, for example, the composition comprises from 10% to 30% gelatin (w/v), and from 1% to 3% alginate (w/v). In illustrative embodiments of the invention, the presence, amounts and/or ratios of one or more constituents in the composition is controlled so that the composition exhibits a tensile strength of at least 60, 70, 80 or 90 kPa, and/or exhibits a toughness of at least 15, 20, 25 or 30 $kJ/m^3$; and/or exhibits a tensile strain of at least 0.6 or 0.7 mm/mm.

Other embodiments of the invention include methods of making a composition disclosed herein, for example by combining together alginate and gelatin, and optionally a photoinitiator agent, a pharmaceutical excipient and/or a therapeutic agent so as to form the composition. In certain embodiments of these methods, relative amounts of alginate and gelatin are selected so that the composition exhibits a tensile strength of at least 60, 70, 80 or 90 kPa, and/or exhibits a toughness of at least 15, 20, 25 or 30 $kJ/m^3$; and/or exhibits a tensile strain of at least 0.6 or 0.7 mm/mm. By modulating the mechanical properties of the compositions of the invention in this manner, embodiments of the invention can be tailored for use in a variety of different clinical applications. In this context, a wide variety of art accepted materials and methods can be adapted for use in embodiments of the invention, for example those disclosed in U.S. Patent Publication Nos.: 20050227910, 20100120149, 20120315265, 20140302051 and 20190290804; and Lee, Biomaterials Research volume 22, Article number: 27 (2018); Thambi et al., J Control Release. 2017 Dec. 10; 267:57-66. doi: 10.1016/j.jconrel.2017.08.006. Epub 2017 Aug. 4; and Gianonni et al., Biomater. Sci., 2016, the contents of which are incorporated by reference.

Other embodiments of the invention include methods of delivering a composition disclosed herein to a preselected site, the methods comprising disposing the composition at the site and then crosslinking the composition in situ. Typically in these methods, the site is an in vivo site such as an in vivo location where an individual has experienced trauma or injury. In illustrative embodiments of these methods, the site comprises vascular, bladder, lung or heart tissue.

Other embodiments of the invention include methods of adhering a first material to a second material. Typically these methods comprise placing a gelatin alginate composition in contact with the first material and the second material, wherein the composition comprises the comprises from 10% to 30% gelatin; from 1% to 3% alginate (w/v), with the alginate and/or gelatin compositions comprising crosslinkable moieties (e.g. methacrylic groups); a divalent ion (e.g. $Ca^{++}$); and a crosslinking agent (e.g. visible light photoinitiators such as VC, TEA, and Eosin Y). These methods then comprise exposing the composition to light such that the crosslinkable moieties are crosslinked, thereby adhering the first material to the second material. In some embodiments of the invention, the first material or the second material comprises a biocompatible thin planar sheet such as a collagen sheet. In certain embodiments of the invention, the first material or the second material comprises an in vivo tissue (e.g. in methods designed to adhere a first tissue to a second tissue in vivo). In some embodiments of the invention, the composition used in these methods further comprises a therapeutic agent selected from an anti-inflammatory agent, an embolic agent, and a chemotherapeutic agent; and/or the composition: exhibits a tensile strength of at least 60, 70, 80 or 90 kPa; exhibits a toughness of at least 15, 20, 25 or 30 $kJ/m^3$; and/or exhibits a tensile strain of at least 0.6 or 0.7 mm/mm.

Additional aspects and embodiments of the invention are discussed in the following sections.

Materials and Methods

Materials

Type A porcine gelatin, alginic acid sodium salt from brown algae (low viscosity alginate), methacrylic anhydride (MA; purity≥94%), triethanolamine (TEA; purity≥99%), N-vinylcaprolactam (VC; purity≥98%), eosin Y, calcium chloride dihydrate (purity≥99%), dimethyl sulfoxide-$d_6$ (DMSO-$d_6$; purity≥99%), and deuterium oxide ($D_2O$, purity≥99.9%) were all purchased from Sigma-Aldrich. Type II collagenase, Dulbecco's phosphate-buffered saline (DPBS), and ethanol were from Thermo Fisher Scientific. Synthesis of Gelatin Methacryloyl (GelMA) and Methacrylate-Modified Alginate (AlgMA)

Gelatin methacryloyl (GelMA) was prepared according to the literature (45,46). In brief, 10 g of type A gelatin from porcine skin was added to 100 mL of DPBS to make a 10% w/v gelatin solution, stirred at 250 rpm and 50° C. to fully dissolve gelatin. The reaction vessel was then covered with aluminum foil, and 8 mL of MA was added dropwise to the gelatin solution and allowed to react at 50° C. for 2 h. The reaction was stopped following a 3-time dilution with DPBS at 50° C., and the mixture was dialyzed against deionized (DI) water using a 12-14 kDa dialysis tubing (Spectrum™ Spectra/Por™ 4 RC Dialysis Membrane Tubing) for 1 week at 50° C. to remove the impurities and methacrylic acid. The purified solution was lyophilized in a freeze dryer to yield a white foam.

Alginate was modified with methacrylic groups based on a method described in the literature (47). Briefly, 2.5 g of low viscosity alginate was dissolved in 100 mL of DI water at room temperature to yield a 2.5% w/v alginate solution. The same volume of MA (100 mL) was added to the alginate solution dropwise and was allowed to react at room temperature for 3 days while being stirred at 250 rpm on a magnetic stirrer. To separate the product (AlgMA) from the solution, the mixture was poured into 500 mL of ethanol (5 times the initial volume of alginate solution) and stirred until AlgMA precipitated. The precipitate was then vacuum filtered using a 5 μm filter paper (50, Whatman™), dissolved in DI water (100 mL), and precipitated out for the second time using 500 mL of ethanol. This process was repeated at least three times to remove salts and remaining MA from the precipitate. Finally, the precipitate was collected on a filter paper and dried at room temperature overnight.

Preparation of GelMA-Al$_2$MA Hybrid Hydrogels

A GelMA solution (20% w/v) including varying concentrations of AlgMA (0 to 5% w/v) was prepared by dissolving GelMA and AlgMA in 1 mL of DPBS at 37° C. The visible light photoinitiators, VC, TEA, and Eosin Y, were added to the mixture in proportion to the total concentration of methacrylated solid content, i.e., GelMA and AlgMA (see Table S1). The mixture was then placed in the oven at 80° C. for 10 min, vortexed, and incubated at 37° C. overnight to allow AlgMA to fully dissolve in the DPBS. The pre-gel solutions were covalently crosslinked through visible light irradiation (wavelength=450-550 nm, intensity ~100 mW/cm$^2$, Genzyme FocalSeal LS1000 Xenon Light) for 4 min. For the ionic crosslinking of AlgMA post chemical crosslinking, it was incubated in a CaCl$_2$ solution (concentration=0.13 times that of AlgMA, Table S1, at room temperature for at least 5 min.

Chemical Characterization

Nuclear magnetic resonance (NMR) spectroscopy was used for the chemical characterization of biopolymers and crosslinked hydrogels. $^1$HNMR spectra was recorded for all samples at room temperature on a 400 MHz Bruker AV400 spectrometer. All spectra were corrected with phase and base line, and the solvent peak was fixed before quantifying the degree of methacrylation. To quantify the degree of methacrylation, GelMA and AlgMA were separately dissolved in D$_2$O at a concentration of 10 mg/mL, and the degree of substitution was estimated based on literature (48,49). To assess the crosslinking degree of bioadhesives, the hybrid hydrogels containing GelMA 20% w/v and 3% w/v AlgMA were photocrosslinked according to the method explained in previous section. The samples were then immersed in DMSO for 7 days at 37° C. and sonicated for 1 h every day to partially dissolve the hydrogels prior to conducting the NMR spectroscopy. The degree of crosslinking of hybrid hydrogels were calculated by integrating the double bond protons (vinyl) δ 5.28 in consideration with the methyl group of acrylate at δ1.8 as reference peak. For quantitative analyses, at least 3 spectra were analyzed for each hydrogel.

Mechanical Characterizations

An Instron mechanical tester (5943 Series) was used for the tensile and compression testing of hydrogels. At least 5 samples were tested for each condition, and the results were averaged. To prepare samples for the tensile test, 250 μL of a pre-gel solution was transferred to a dumbbell-shaped polydimethylsiloxane (PDMS) mold (gage length=10 mm, gage width=5 mm, gage thickness=1.5 mm, and fillet radius=2 mm) and crosslinked with visible light for 4 min. The samples were then removed from the mold and immersed in 3 mL of their corresponding CaCl$_2$ solution for 30 min to ionically crosslink AlgMA. After removing the CaCl$_2$ solution, the samples were blotted using Kimwipe, and the two ends of the samples were attached to two pieces of glass slides using Super glue (Gel Control). The glass slides were then gripped with Instron jaws, and the tensile tests were performed at a constant strain rate (10 mm/min). Tensile strength was defined as the maximum stress at the point of failure, elastic (Young's) modulus was the slope of the stress-strain curve, and toughness was calculated based on the area under the stress-strain curve.

For compression testing, 75 μL of a pre-gel solution was transferred to a cylindrical PDMS mold (diameter=6 mm and height=1.5 mm), and a glass coverslip was placed on the mold to flatten the top surface. The samples were then crosslinked with visible light followed by CaCl$_2$ incubation as explained before. The compression test was performed using Instron at a strain rate of 0.3 mm/min up to the failure point. Compressive modulus was calculated based on the slope of linear stress-strain curve up to strain=0.2 mm/mm. Cyclic compression tests were performed at the same strain rate up to strain=0.5 mm/mm, and the energy loss was calculated as $$\text{Energy loss \%} = \frac{(\text{Area under loading curve} - \text{Area under unloading curve})}{\text{Area under loading curve}} \times 100$$

Rheological studies were conducted using a modular compact rheometer (MCR 302, Anton Paar, Graz, Austria). The hydrogel samples (n=4) with diameter=8 mm and height=1.5 mm were prepared following the same method used for the compression tests. The samples were then placed onto a sandblasted flat plate and confined with an 8 mm diameter plate to perform the rheological tests using the rheometer. Mineral oil (M5904 from Sigma-Aldrich) was applied around the plate to prevent water evaporation and maintain the hydrogel moist. Shear strain sweeps were conducted at 37° C., strain=0-100%, and angular frequency=1 rad/s, and frequency sweeps were performed at angular frequency=0-100 rad/s and strain=0.1%. The storage modulus (G'), loss modulus (G"), and loss factor (G"/G') were reported at angular frequency=1 rad/s and strain=0.1%.

Assessment of Swelling and Degradation

In order to test the physical characteristics of bioadhesive hydrogels, cylindrical samples (diameter=8 mm and thickness=1.5 mm, 5 samples for each condition) were prepared in PDMS molds following the procedure explained for compression tests. The weight of wet samples after crosslinking was measured ($W_w$), and the samples were allowed to swell in DPBS at 37° C. for 1, 2, 4, and 8 h. At the end of experiments, the samples were removed from DPBS, gently blotted with Kimwipe, and their weight was measured ($W_s$). The swelling ratio was calculated as $$\text{Swelling ratio \%} = \frac{(W_s - W_w)}{W_w} \times 100$$

For the degradation assessment, the cylindrical samples were immersed in a DPBS solution containing 10 µg/mL of collagenase at 37° C. The samples were removed from the solution at desired incubation times, rinsed 3 times with DI water, lyophilized and the dry weight was recorded. The degradation ratio was calculated as $$\text{Degredation \%} = \frac{(W_d - W_t)}{W_t} \times 100$$

where $W_i$ is the initial dry weigh of samples before immersion in the collagenase solution, and $W_d$ is their dry weight after incubation in the collagenase solution at a given time.

In Vitro Assessment of Sealing Properties

In Vitro Burst Pressure

Figure 4:
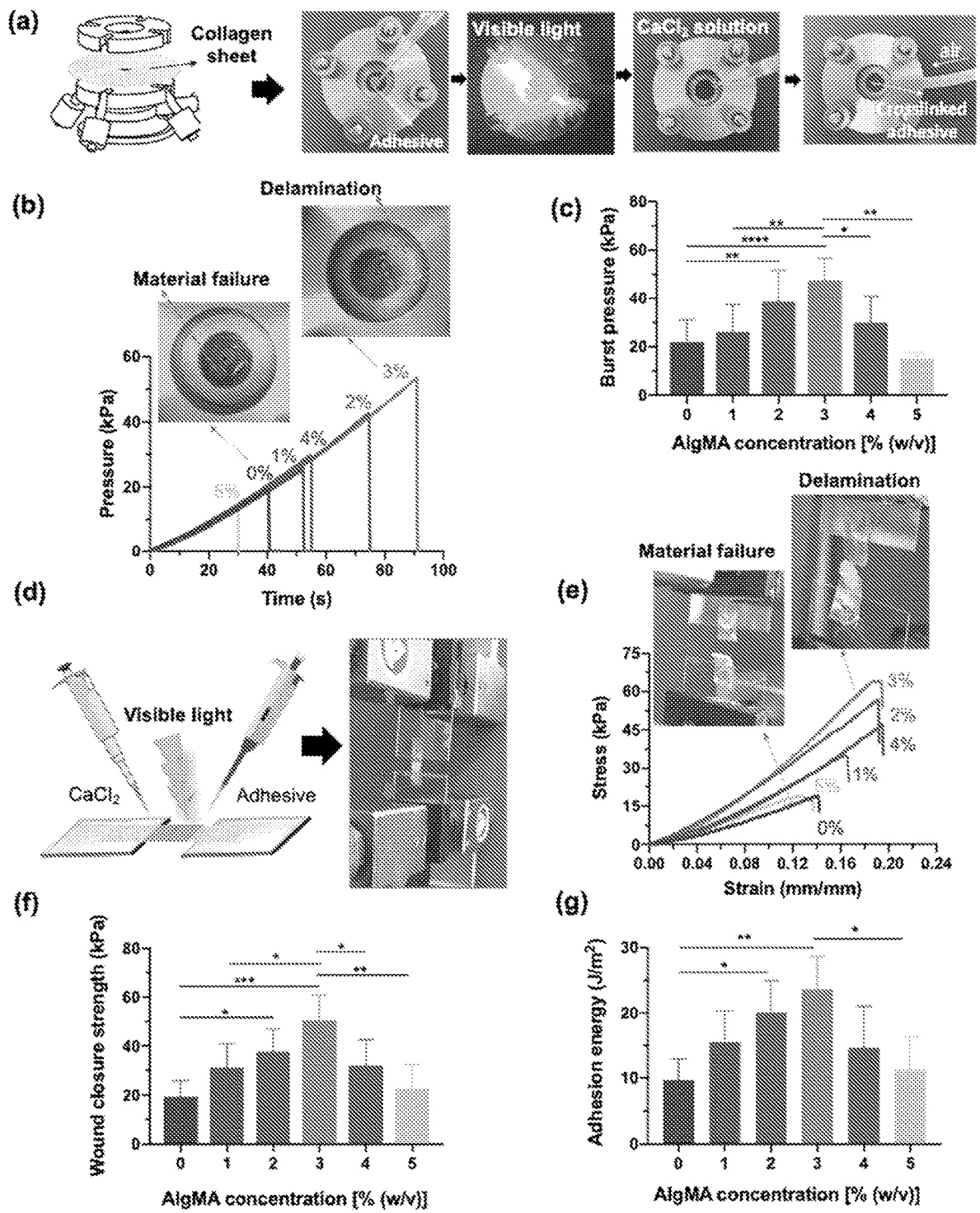
FIGS. 4A-4G. In vitro sealing properties of hybrid hydrogels composed of GelMA (20% w/v) and varying concentrations of AlgMA.

In vitro burst pressure tests were performed following the standard protocol for the burst strength of surgical sealants (ASTM F2392-04 (50)). Collagen sheets (Weston 19-0102-W 33 mm Collagen Sausage Casing) were cut into round pieces (diameter=30 mm) and rinsed three times with DI water to remove glycerin and soften the sheets. A circular defect (diameter=1 mm) was created in the center of collagen sheets using a biopsy punch, and sheets were immersed in DBPS for 10 min at room temperature prior to use. A collagen sheet was then removed from DPBS, gently blotted with Kimwipe to remove the excess liquid, and placed onto the burst pressure device as shown in FIG. 4a. The pre-gel solution (20 µL) was applied on the defect and irradiated with visible light for 4 min, followed by 5 min exposure to 1 mL of $CaCl_2$ solution (see Table S1). The burst pressure testing system was connected to a syringe pump (Aaddin-1000HP, WPI Inc.), and air was blown under the sealed collagen sheet at a constant rate of 20 mL/min. Pressure was registered using a sensor (PASCO Wireless Pressure) monitored by SPARKvue (version 4.0.0.18, PASCO) software. Burst pressure was defined as the maximum pressure at which the adhesive failed due to the material rupture or delamination from the collagen sheet. At least 5 samples were tested for each condition, and the burst pressure values were averaged.

In Vitro Wound Closure Test

Wound closure strengths of the samples were examined following the standard test method for the wound closure strength of tissue adhesives and sealants, ASTM F2458-05 (51), with some modifications. In brief, a collagen sheet was cut into rectangular pieces of (5×20 mm$^2$) and stored in DPBS at room temperature for 10 min prior to the experiments. To prepare the samples, the collagen sheet was blotted with Kimwipe to remove the excess liquid, and each end of the sheet was glued to two pieces of glass slides, which were 6 mm apart using Super glue. An incision was made in the center of collagen sheet using a razor blade, and 20 µL of the pre-gel solution was applied onto the incision to cover the area (5×6 mm$^2$). Subsequently, the adhesive was crosslinked with the visible light and $CaCl_2$ as explained previously. The glass slides were then transferred to the Instron mechanical tester, and special attention was paid to avoid distortion and unnecessary mechanical stress. The sample was then stretched at the constant rate of 1 mm/min, and the wound closure strength of sealant materials was determined at the point of rupture, and the adhesion energy was calculated based on a method reported for measuring adhesion energy between stretchable materials (J. Tang, J. Li, J. J. Vlassak, Z. Suo, *Soft Matter* 2016, 12, 1093). In brief, the total energy used for hydrogel debonding and deformation was calculated based on the area under the stress-strain curves. The energy that was consumed for the hydrogel deformation at the site of defect was estimated based on the tensile stress-stain behavior of hydrogels shown in FIG. 2b. The adhesion energy was calculated by subtracting the deformation energy from total energy, which was normalized based on the area of hydrogel that was detached from the collagen sheet under tensile stress. At least 5 replicates were tested for each condition, and the results were averaged.

Ex Vivo Sealing Tests

For the ex vivo experiments, the tissues were obtained from discarded animals provided by UCLA animal facility. The tissues were stored not more than 24 h in the refrigerator at 4° C. prior to the experiments.

Ex Vivo Burst Pressure

The pressure required to rupture/detach the bioadhesives from the ex vivo porcine bladder model were measured using at least 5 hydrogels per condition. A circular defect (diameter=3) mm was made on the bladder using a biopsy punch (FIG. 5aii), and 100 µL of the pre-gel solution was applied onto the defect, irradiated with visible light for 4 min, and incubation in 1 mL of $CaCl_2$ solution for 10 min. The bladder was gradually filled with DI water at a constant rate of 20 mL/min using a peristaltic pump (BT100-1l, Longer Pump), and the pressure was monitored using the same setup explained for measuring in vitro burst pressure. The burst pressure was defined as the maximum pressure at which water started leaking from the sealed defect, reflected in dropped or plateaued pressure.

Ex Vivo Wound Closure

The ex vivo wound closure efficacy of the hydrogels (n=4) was investigated using a porcine ureter anastomosis model. The ureter was cut into 30 mm-long pieces and a plastic tube with a diameter of 1 mm was inserted in the ureter. An incision was made in the center of ureter using a razor blade, and 100 µL of the bioadhesive was applied all around the incision, which was irradiated with visible light for 4 min. $CaCl_2$ solution (1 mL) was subsequently applied onto the adhesive and incubated for 5 min. The tube was removed, and the two ends of the ureter were fixed onto two pieces of glass slides using Super glue. The glass slides were then placed onto Instron mechanical tester and stretched at a rate of 1 mm/min. The anastomosis strength was defined as the maximum stress at which the sealant ruptured or detached from the tissue.

Statistical Analysis

Statistical analysis was performed using one-way analysis of variance (ANOVA) and followed by Tukey's multiple comparison test. Statically significant differences were identified as * ($p<0.05$),  ($p<0.01$), *($p<0.001$), or **** ($p<0.0001$).

Results and Discussion

The hybrid hydrogels are composed of two widely-used, biocompatible biopolymers, gelatin and alginate, both modified with vinyl groups via a facile reaction with methacrylic anhydride. The pendant methacrylic/methacryloyl groups can be activated using a broad range of initiators, such as photo-initiators for the minimally-invasive crosslinking of biopolymer solution. The potential interactions between the biopolymers in the vicinity of tissues are presented in FIG. 1. GelMA and AlgMA can be self-crosslinked or covalently attached to each other via the photo-activated reaction of vinyl groups, forming mechanically resilient network of hydrophilic biopolymers, which can provide a biocompatible microenvironment. The MA groups on these biopolymers may also react with the amine groups on the tissue to form chemical bonds, fostering tissue adhesion. Hydrogen bonds can also be formed between GelMA and AlgMA at the tissue-biopolymer interface, enforcing the tissue adhesion. Importantly, calcium ions physically crosslink AlgMA to form the so-called egg box structure (52), which can be partially broken upon applying shear and reversibly rearrange the biopolymer structure.

Figure 6:
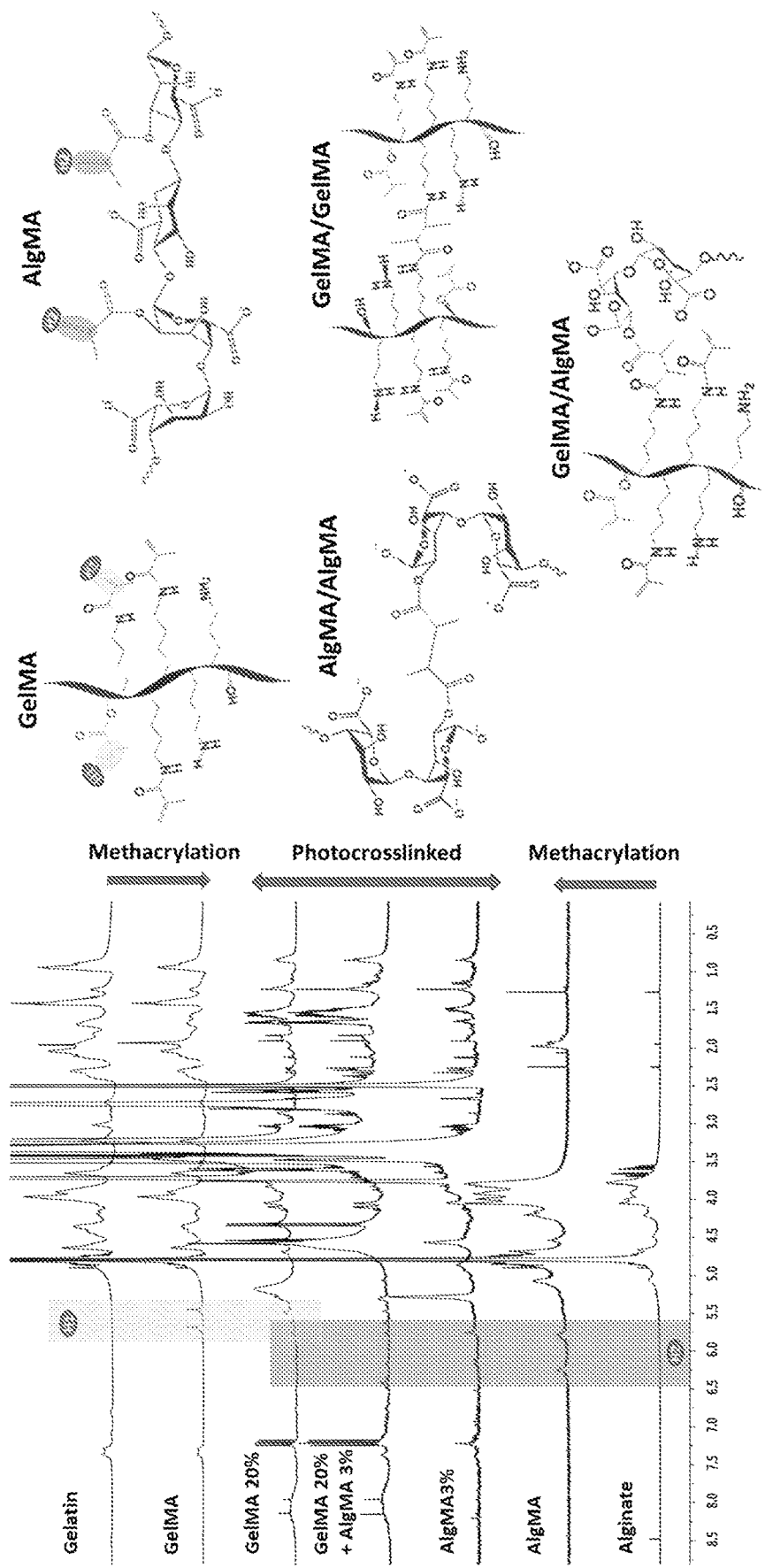
FIG. 6. $^1$HNMR spectra of pre-gel solutions and crosslinked hydrogels. The left panel shows $^1$HNMR spectra of pre-gel solutions, while the right panel provides a schematic showing biopolymers including gelatin, GelMA, crosslinked GelMA (20%), alginate, AlgMA, crosslinked AlgMA (3%), and crosslinked GelMA (20%)-AlgMA (3%) hybrid hydrogels.

The $^1$HNMR spectra of pre- and post-crosslinked hydrogels are shown in FIG. 6. The degree of methacrylation for GelMA and AlgMA were ~64% and 19%, respectively. Peaks in the shaded area reflects the methacrylation of parent components, gelatin and alginate. The low degree of conjugation for alginate can be attributed to its structural complexity compared to gelatin. For GelMA and AlgMA, 53% and 49% crosslinking of MA groups were observed, respectively, when visible light was exposed to the hydrogels for 4 min. In the $^1$HNMR spectra, the normalized intensity of vinyl hydrogen related to the acrylic groups decreased upon photo-induced crosslinking. The degree of crosslinking was calculated by integrating the double bond proton peaks (vinyl) considering methyl peaks as reference (48,49). Same procedure was followed to calculate the percentage of crosslinking for the hybrid hydrogel, which was found to be approximately 65%.

Figures 2A, 2B, 2C, 2D, 2E, 2F:
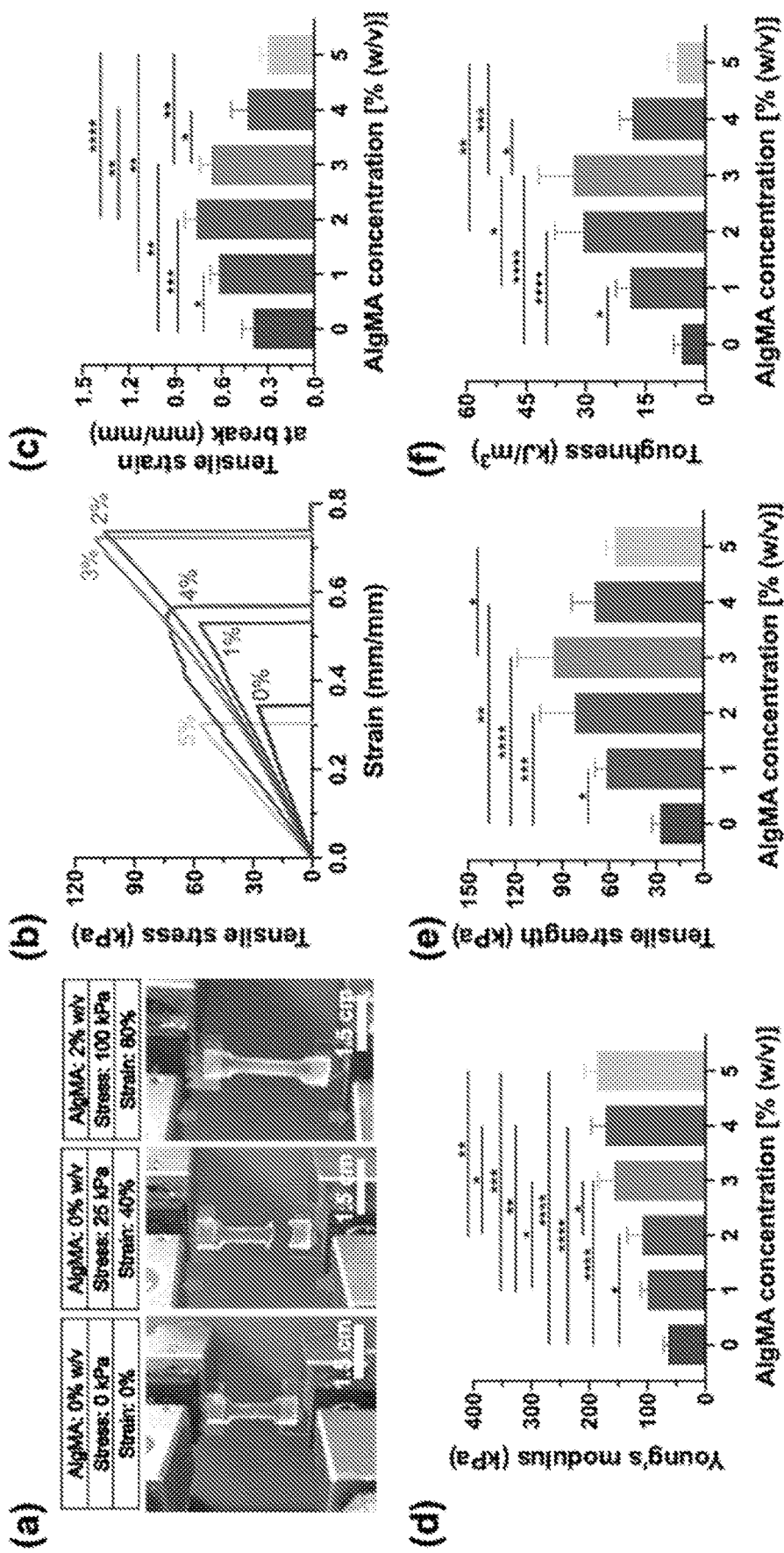
FIGS. 2A-2O. Mechanical and rheological properties of hybrid hydrogels composed of GelMA (20% w/v) and varying concentrations of AlgMA.

To develop a stretchable, tough sealant from two of the most abundant biopolymers in the world, we combined GelMA and AlgMA at a fixed GelMA concentration (20% w/v). The GelMA concentration was chosen based on our previous studies, establishing the optimum concentration of GelMA to achieve the best sealing performance while providing an injectable pre-gel solution (20). We studied the effect of AlgMA concentration on the mechanical properties of hybrid hydrogels. FIG. 2a presents the visual difference between GelMA hydrogel and the hybrid GelMA-AlgMA hydrogel under tensile stress. Only 40% of strain is able to break the GelMA hydrogel, seen in the middle panel; however, adding only 2% AlgMA to GelMA, photocrosslinking followed by ion-mediated physical crosslinking of hybrid hydrogel increase the failure strain from 40% to 80%. Examples of tensile strain-stress curves for the hybrid hydrogels are shown in FIG. 2b. The tensile stress linearly increases as the strain increases until the hydrogel is broken. The tensile strain at break (FIG. 2c) shows that increasing the AlgMA concentration up to 2-3% (w/v) increases the ultimate strain (stretchability) of hybrid hydrogels by 100%. Further increasing AlgMA concentration decreases the stretchability, possibly as a result of increased brittleness. The increased brittleness may be a result of increased chemical crosslinking density, decreasing the length of polymer chains between crosslinking nodes. The shortened chain size results in the decreased fracture energy (31). The tensile (Young's) modulus, shown in FIG. 2d, continually increases by increasing the AlgMA concentration as a result of increased crosslinking density. At 3% AlgMA, the Young's modulus is ~3 times the modulus in the absence of AlgMA. The tensile strength, i.e., the tensile stress at break, has a similar behavior to ultimate tensile strain. FIG. 2e presents the tensile strength of hybrid hydrogels containing varying concentrations of AlgMA. Increasing the AlgMA concentration increases the tensile strength by a factor of 3 at an AlgMA concentration of 2-3%, whereas high AlgMa concentrations (>3%) significantly decreases the tensile strength. FIG. 2f shows the toughness of the hybrid hydrogels, obtained from the area under the tensile strain-stress curves. Interestingly, the toughness significantly increases by increasing the AlgMA concentration to 2-3%. At this concentration of AlgMA, the toughness of hybrid hydrogels is more than 300% of the GelMA hydrogel. Increasing the AlgMA concertation further than 3%, significantly decreases the toughness of the hybrid hydrogels. At ≥5% AlgMA, the hybrid hydrogels have toughness very similar to that of an AlgMA-free hydrogel, which is due to the increased brittleness and weakened stretchability of hydrogels.

Figures 2G, 2H, 2I, 2J, 2K, 2L, 2M, 2N, 2O:
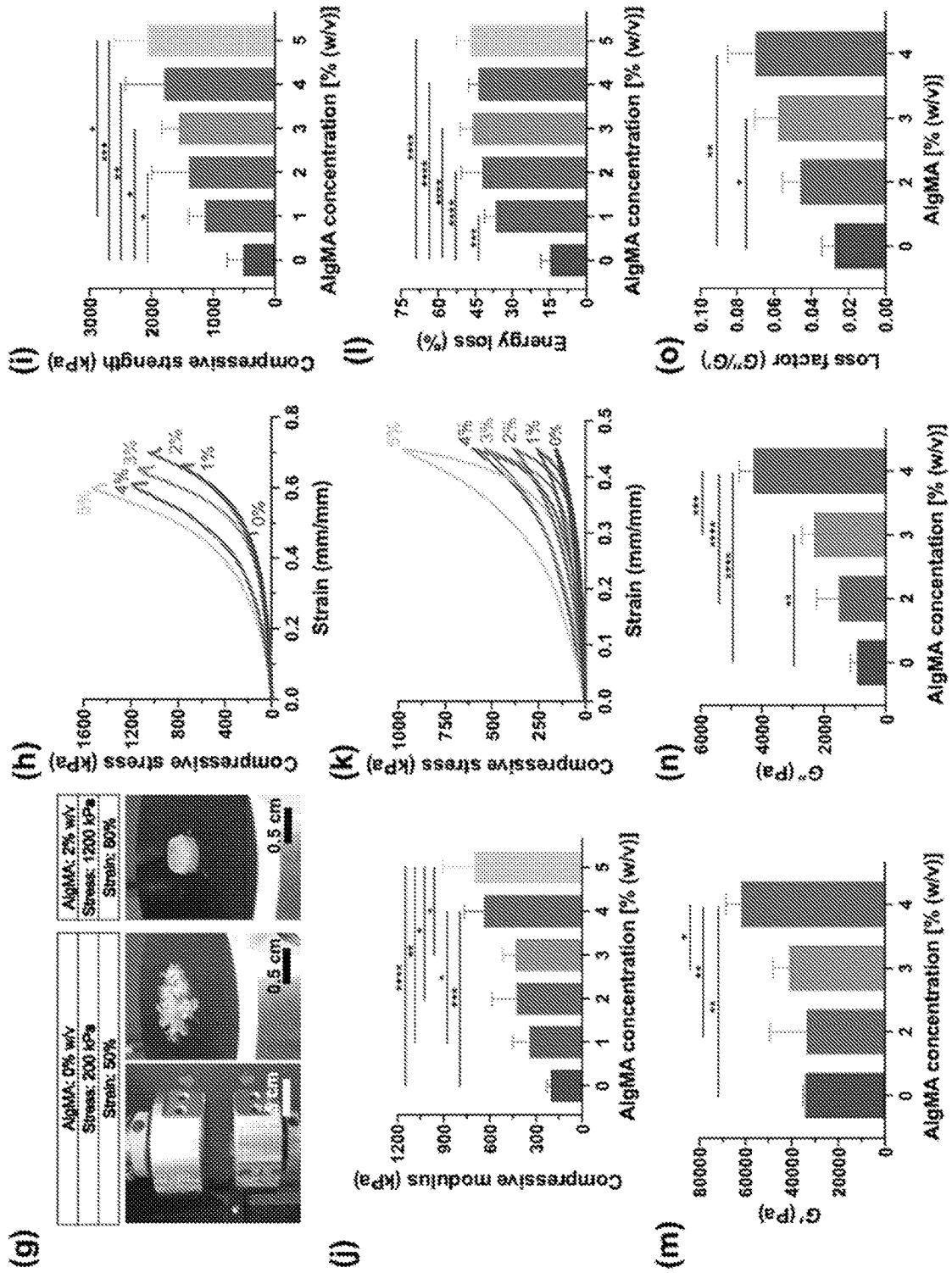

Another important property of bioadhesive materials is their resistance against compression. A suitable bioadhesive must resist against compressive stress and should not break. The stress may originate from daily activities, such as running, or unwanted events, such as falling down o hitting an object. FIG. 2g presents the images of the GelMA hydrogel and a hybrid GelMA-AlgMA hydrogel post compression. The GelMA hydrogel undergoes severe mechanical damage at only 50% strain, whereas the hybrid hydrogel including 2% AlgMA withstands 3 times higher compressive stress and holds its integrity at more than 80% strain. Such a remarkable improvement in the mechanical properties of GelMA may be of interest in a broad range of biomedical applications, particularly for developing regenerative, tough cell-laden scaffolds. FIG. 2h presents examples of compressive strain-stress curves for the hybrid hydrogels. As can be seen in this figure, at a given strain, the compressive stress of a hybrid hydrogel increases as the AlgMA concentration increases. FIG. 2i presents the compressive strength, defined as the maximum stress that the hydrogels can withstand before breaking, versus AlgMA concentration. Increasing the AlgMA concentration continually increases the compressive strength. Similarly, the compressive modulus of hybrid hydrogels increases when the AlgMA concentration increases (FIG. 2j). Increased stiffness of hybrid hydrogels is mainly a result of covalent binding among GelMA and AlgMA biopolymers. FIG. 2k shows the cyclic compression of hybrid hydrogels. Increasing the AlgMA concentration increases the compressive hysteresis of hydrogels as a result of unzipping the $Ca^{2+}$-crosslinked G blocks of AlgMA followed by the re-establishing of physical bonds in the egg box structure. The energy loss, shown in FIG. 2l, obtained from the area inside the compressive hysteresis curve increases from ~15% for the GelMA hydrogel to ~45% when AlgMA concentration is ~2-3% w/v.

Figure 7:
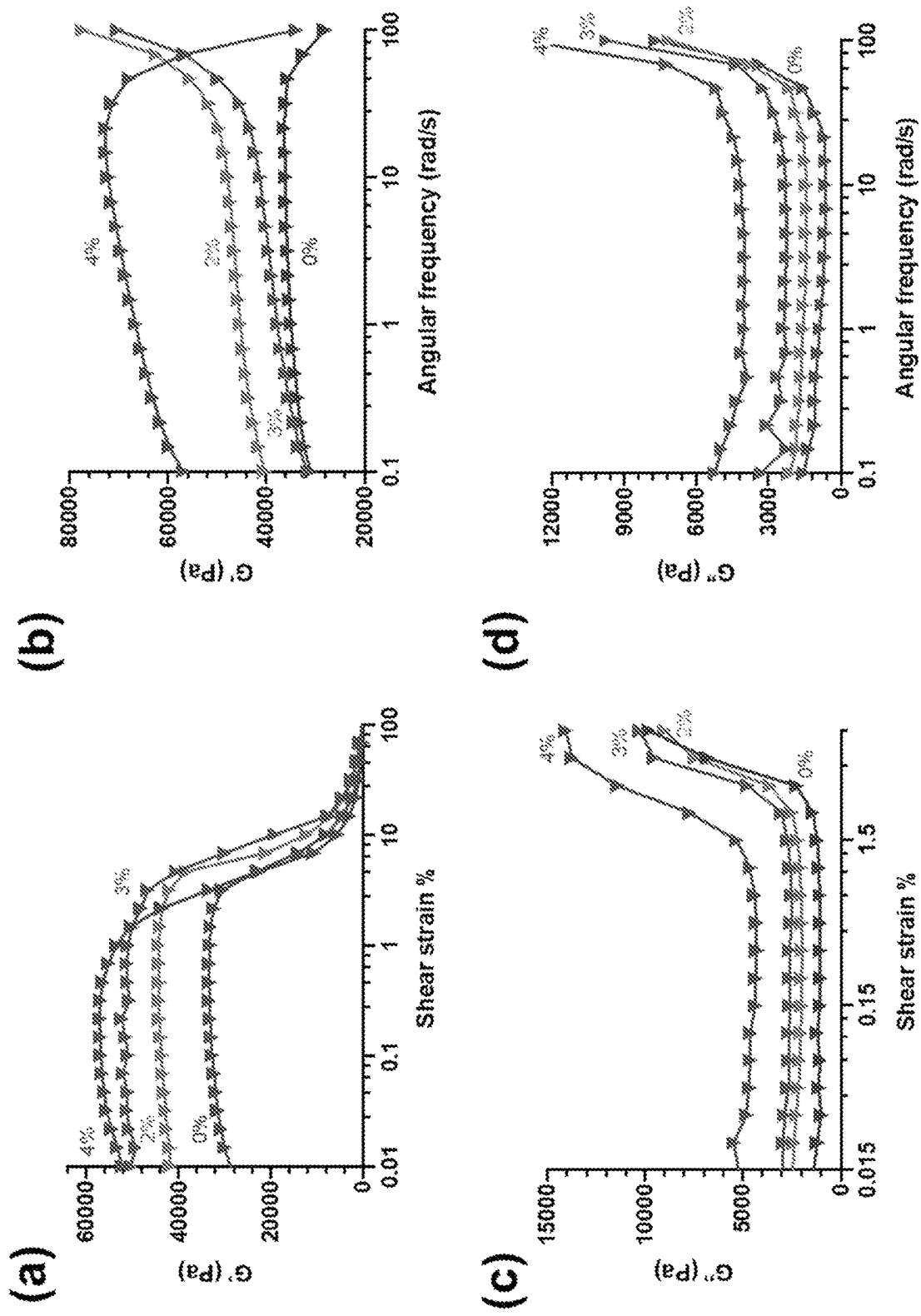
FIGS. 7A-7D. Viscoelastic properties of GelMA-AlgMA hybrid hydrogels.
Figure 8:
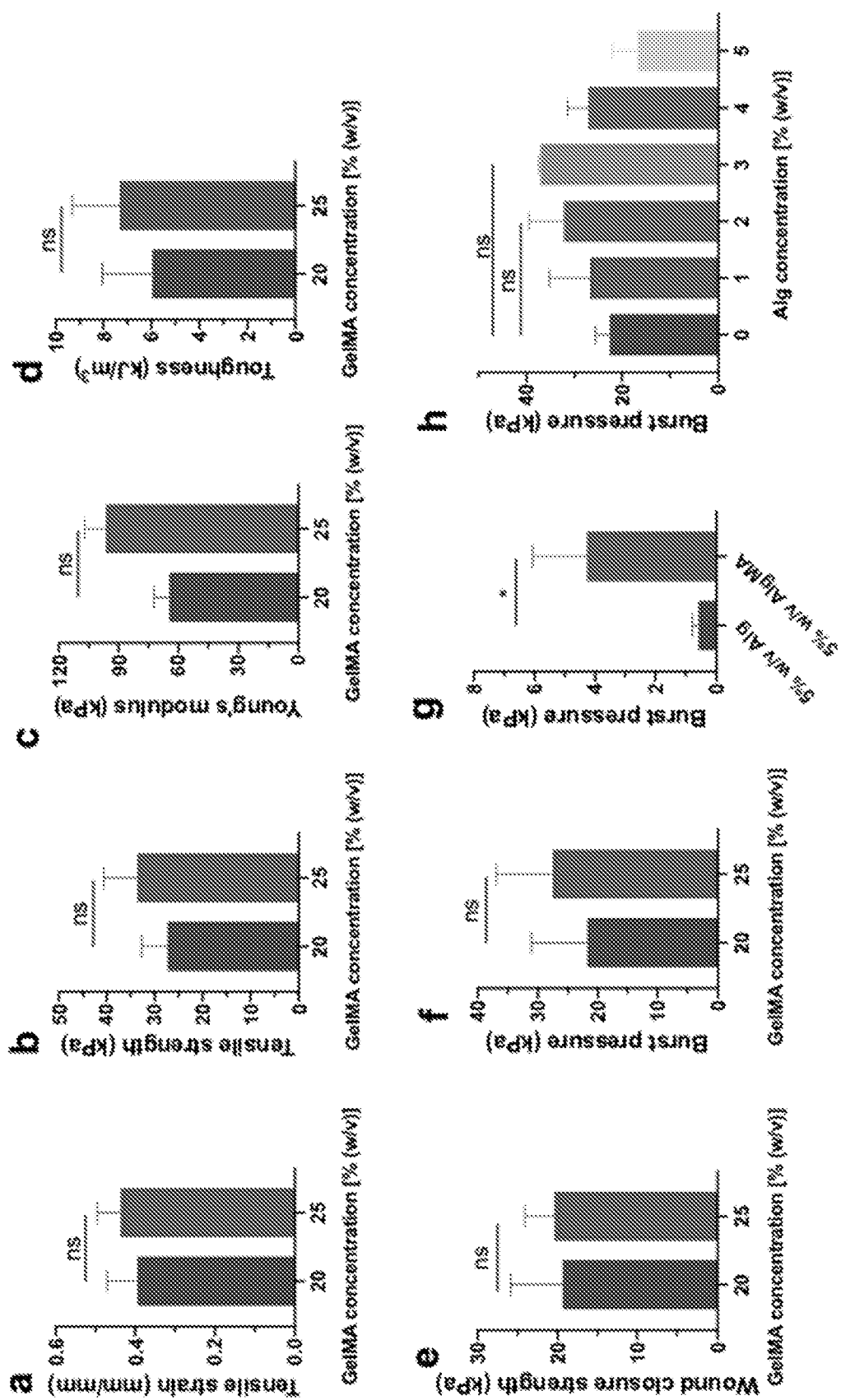
FIGS. 8A-8H. Mechanical and adhesive properties of various biopolymeric systems.

FIGS. 2m-o present the rheological properties of hybrid hydrogels comprising varying concentrations of AlgMA. The storage modulus (G', FIG. 2m) and loss modulus (G", FIG. 2n) of hybrid hydrogels, measured through small angle oscillatory rheology at oscillatory frequency ~1 rad s$^1$ and strain ~0.1% continually increase by increasing the AlgMA concentration. The effect of AlgMA is more pronounced on the loss moduli, possibly because of the improved energy dissipation as a result of reversible disruption of $Ca^{2+}$-mediated physical bonds between G blocks. The loss factor or damping factor (FIG. 2o), defined as the ratio of G" to G' shows that while the hybrid hydrogels have a solid-like behavior, i.e., loss factor<<1, increasing the AlgMA concentration continually increases the loss factor as a result of increased energy dissipation at a low oscillatory strain. The viscoelastic moduli versus oscillatory shear strain (at angular frequency ~1 rad s$^{-1}$) and versus angular frequency (at oscillatory shear strain ~0.1%) for the hybrid hydrogels composed of GelMA (20% w/v) and varying concentrations of AlgMA are shown in FIG. 7. Note that the improvement in the mechanical properties of hybrid hydrogels is not the result of increase solid content (FIG. 8).

Figure 3:
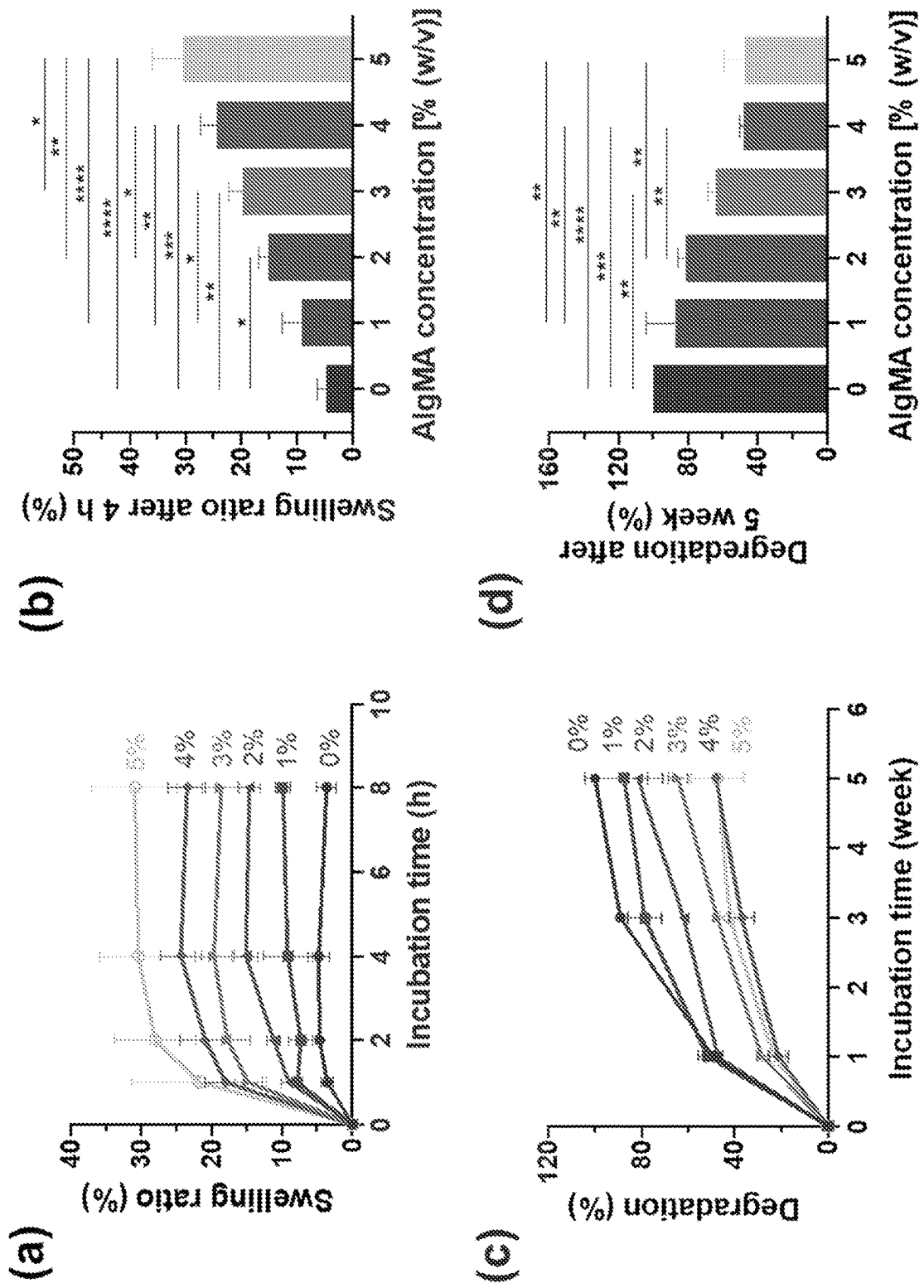
FIG. 3($a$) shows time-dependent swelling ratio of hydrogels immersed in DPBS at 37° C.

The physical properties of hybrid hydrogels, particularly swelling and degradation are important in evaluating their potential for sealing tissues and supporting the tissue regeneration process. A high swelling ratio post crosslinking may result in inevitable stress imposed to the tissue-hydrogel interface, resulting in the delamination of the adhered gel. FIG. 3a shows the swelling kinetics of hybrid hydrogels versus incubation time in DPBS at 37° C. Regardless of the AlgMA concentration, the hybrid hydrogels reach their equilibrium swelling in about 4 h post crosslinking. FIG. 3b presents the equilibrium swelling ratio of hydrogels after 4 h incubation in DPBS. Increasing the AlgMA concentration increases the swelling ratio from ~5% for AlgMA-free GelMA to ~20% when the AlgMA concentration is about 3%. The degradation of hybrid hydrogels in the presence of collagenase, one of the main enzymes responsible for degrading collagen in vivo, was evaluated. FIG. 3c presents the kinetics of enzyme-mediated degradation of hybrid hydrogels within 5 weeks post crosslinking. In the presence of collagenase (1.25 U/mL), all the hydrogels undergo degradation over time. At low AlgMA concentrations (<2%), in 1 week, more than 40% of the hydrogels degrade and by the $5^{th}$ week, less than 20% of them were remained. FIG. 3d shows the degradation of hydrogels after 5 weeks of incubation in the collagenase solution. Increasing the AlgMA concentration continually decreased the degradation rate of hydrogels from ~90% in the absence of AlgMA to ~40% when 4-5% AlgMA was present. When the AlgMA concentration is less than 2%, there is no significant change in the degradation of hybrid hydrogels compared to the degradation of GelMA.

The adhesive properties of hybrid hydrogels were assessed using standard tissue adhesion protocols. FIG. 4a presents the in vitro burst pressure setup, comprising two custom-built compartments sandwiching a collagen sheet. The collagen sheet was perforated to mimic a wound, and the pre-gel solution was pipetted onto it, followed by exposure to visible light to form a bioadhesive gel, sealing the artificial hole. The capability of the hydrogels in sealing the hole was evaluated by introducing air and measuring the pressure until the sealant is damaged and/or detached. FIG. 4b presents the representative pressure profiles versus time obtained from the burst pressure experiments. As the air was introduced under the sealed hole, the pressure linearly increased until the sealant was damaged, resulting in an abrupt pressure drop. The pressure drop was whether a result of sealant mechanical failure or delamination, depending on the composition of hybrid hydrogel. The AlgMA-free sealant mainly failed due to the mechanical damage, whereas when 3% of AlgMA was added to GelMA, the mode of failure was delamination. Adding a low concentration of AlgMA to GelMA improved the mechanical properties of the hydrogels. FIG. 3c shows the burst pressure of hybrid hydrogels versus the concentration of AlgMA. Increasing AlgMA up to 2-3%, continually increases the burst pressure. The hybrid hydrogels including 3% AlgMA had approximately 2.5 times higher burst pressure than the AlgMA-free gel. Importantly, increasing the AlgMA concentration beyond 3%, adversely affected the burst pressure and deteriorated the performance of the hybrid gels in sealing the hole, because excessive increase in the AlgMA content of hybrid hydrogels increased brittleness and decreased tissue adhesion.

FIG. 4d presents the schematic of wound closure experiments, conducted by performing tensile tests on torn porcine skin adhered using the sealant hydrogels. The representative tensile strain-stress curves are shown in FIG. 4e. Similar to the burst pressure experiments, in the absence of AlgMA or when the concentration of this biopolymer is higher than 3%, the sealant typically ruptures (bulk material) indicating a mechanical failure; however, at 2-3% AlgMA, the failure is mainly due to the hydrogel detachment from the porcine skin, i.e., interfacial delamination. The wound closure strength, defined as the maximum stress that the sealant can tolerate before failure, is shown in FIG. 4f. The effect of AlgMA on the wound closure strength of hybrid hydrogels is similar to the burst pressure. There exist an optimum AlgMA concertation at which the wound closure strength is maximized, which is typically in the range of 2-3%, resulting in more than 250% improvement in the wound closure strength. Consistently, the maximum adhesion energy was obtained for hydrogels containing 2-3% AlgMA, which was ~150% higher than that for the pure GelMA (FIG. 4g).

To simulate the sealing of stretchable organs, we conducted ex vivo sealing experiments on porcine bladder and ureter. FIG. 5a shows an ex vivo porcine bladder (5, ai) undergoing manual perforation (5, aii), followed by the deposition of hybrid pre-gel solutions (5, aiii), visible-light mediated crosslinking (5, aiv), $CaCl_2$ treatment (5, av), and filling with DPBS (5, avi). The pressure that the sealed bladder withstands is presented in FIG. 5b. As can be seen in this figure, the composition of hybrid hydrogels has a direct effect on the burst pressure. The AlgMA-free sealant provides a burst pressure of ~2 kPa, which increases to >5 kPa by increasing the AlgMA concentration to 2%. Further increase in the AlgMA concentration to 5% significantly decreases the burst pressure to a value comparable with the AlgMA-free hydrogel. The effect of AlgMA on the ex vivo burst pressure is similar to that on the tensile strength, toughness, and wound closure strength.

Figure 5:
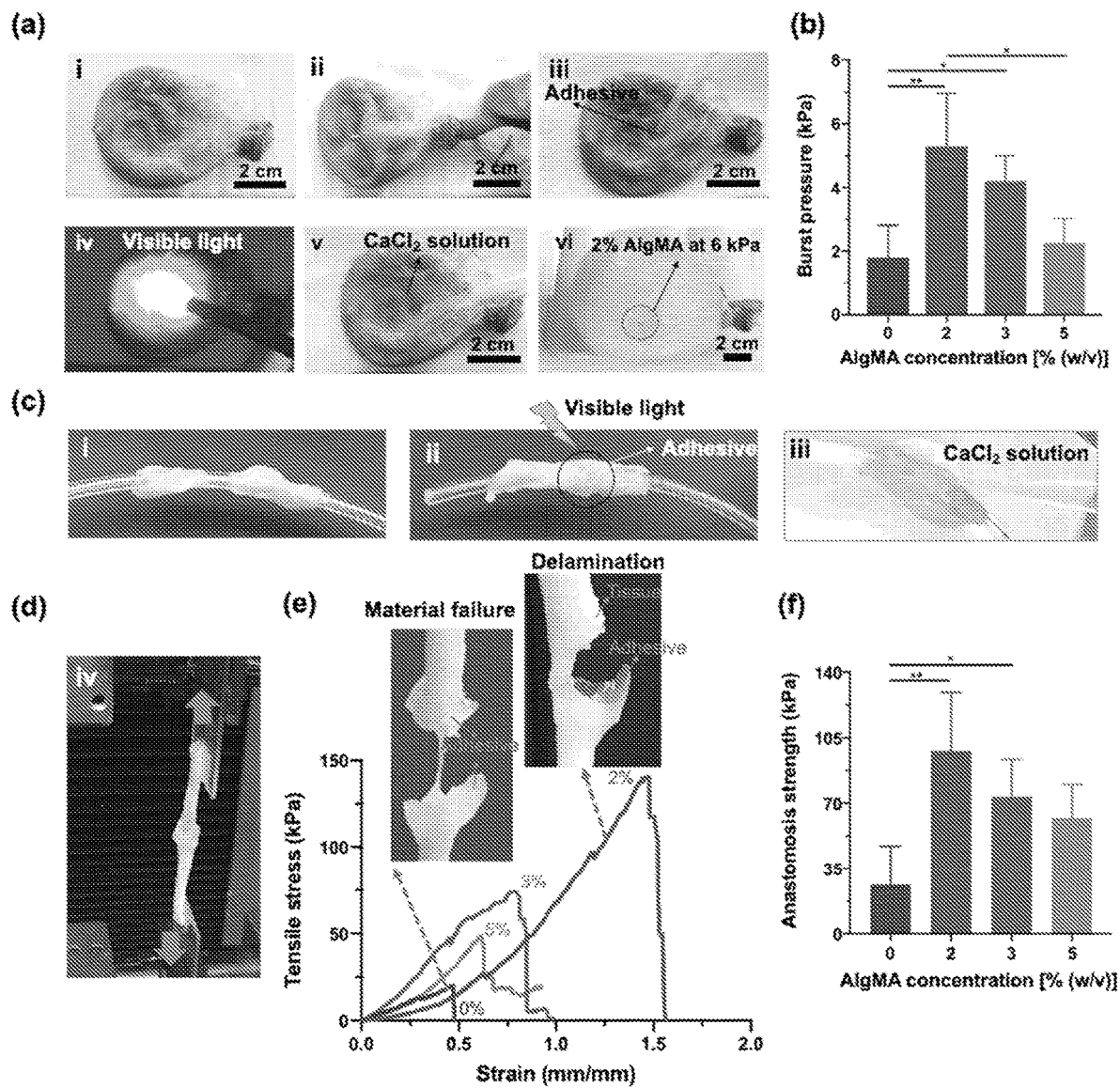
FIG. 5(a, vii): the average burst pressure for the hybrid bioadhesives including varying AlgMA concentrations.

We have also evaluated the capability of hybrid hydrogels in connecting two pieces of torn tissues, such as ureter. While conventional ureter anastomosis techniques, such as suturing, is challenging, the hybrid hydrogels can be readily used to bring two pieces of cut ureter (FIG. 5, ci) together and adhere them via photocrosslinking (FIG. 5, cii) followed by $Ca^{2+}$-mediated physical bonding (FIG. 5, ciii). The anastomosed ureters were examined via the tensile tests (FIG. 5d), and the tensile stress versus strain curves were obtained for the hybrid hydrogels containing varying amounts of AlgMA (FIG. 5e). In the absence of AlgMA or when the AlgMA concentration is higher than 3%, the sealant ruptures under tensile stress due to the poor mechanical properties, e.g., brittleness. At an optimum concentration of AlgMA (2%), the sealant does not undergo mechanical damages and at a tensile strength >6 times higher than that of the AlgMA-free sealant, the hybrid sealant detaches from the tissue. The mode of failure attests to the significant improvement in the mechanical properties of GelMA hydrogel when a small amount of AlgMA is added to it, originated from the physically-crosslinked AlgMA, enhancing the hydrogel toughness. FIG. 5f presents the anastomosis strength versus AlgMA concentration. While the anastomosis strength for AlgMA-free sealants is ~20 kPa, the failure of hybrid GelMA-AlgMA (2%) sealants occurs at ~90, a four-fold increase in the resilience against tensile failure, which decreases to ~60 kPa at 5% AlgMA. The improvement in the sealing properties of hybrid hydrogels is not due to the increased solid content (FIG. 8).

CONCLUSIONS

Developing injectable tough tissue adhesive biomaterials is an unmet clinical need for the minimally invasive sealing of damaged tissues, particularly when sutures or staples are not favorable. We have developed a hybrid biopolymer solution made up of GelMA, a widely used biomaterial for tissue engineering and regenerative medicine, and AlgMA that can be readily injected/pipetted into the lesion and adhere to the tissue via visible light-mediated crosslinking. The chemically photocrosslinked hybrid hydrogels undergo physical crosslinking using divalent ions, such as $Ca^{2+}$, to form a reversible egg-box-like network of G blocks. While the chemically-crosslinked MA groups of GelMA and AlgMA contribute to maintaining the structural integrity of the hybrid hydrogel, the physical crosslinking provides a polymer network that dissipates energy under stress, imparting stretchability and toughness to the hybrid hydrogels. This class of protein-polysaccharide based hybrid hydrogels are tissue adhesive and provide excellent sealing properties at low concentrations of AlgMA (2-3%), overcoming the mechanical weakness of GelMA-based tissue adhesives. We speculate that these novel hybrid hydrogels may leverage the sutureless tissue sealing, particularly in challenging organs that experience severe mechanical stress during daily activities.

TABLE S1

Illustrative formulations of hybrid hydrogels.

| Sample | AlgMA % (w/v) | GelMA % (w/v) | VC % (w/v) | TEA % (w/v) | Eosin Y % (w/v) | DPBS (µl) | $CaCl_2$ % (w/v) |
|---|---|---|---|---|---|---|---|
| 1 | 0% | 20% | 1 | 1.5 | 0.006 | 600 | 0 |
| 2 | 1% | 20% | 1.05 | 1.575 | 0.0063 | 580 | 0.13 |
| 3 | 2% | 20% | 1.1 | 1.65 | 0.0066 | 560 | 0.27 |
| 4 | 3% | 20% | 1.15 | 1.725 | 0.0069 | 540 | 0.4 |
| 5 | 4% | 20% | 1.2 | 1.8 | 0.0072 | 520 | 0.53 |
| 6 | 5% | 20% | 1.25 | 1.875 | 0.0075 | 500 | 0.67 |
| 7 | 20% | 0% | 1 | 1.5 | 0.006 | 600 | 2.667 |
| 8 | 0% | 25% | 1.25 | 1.25 | 0.0075 | 500 | 0 |

VC % (w/v) = 0.05 × (GelMA + AlgMA) % (w/v)
TEA % (w/v) = 0.075 × (GelMA + AlgMA) % (w/v)
Eosin Y % (w/v) = 0.0003 × (GelMA + AlgMA) % (w/v)
$CaCl_2$ % (w/v) = 0.13 × AlgMA % (w/v)

REFERENCES (1) A. Kinaci, A. Algra, S. Heuts, D. O'Donnell, A. van der Zwan, T. van Doormaal, Effectiveness of dural sealants in prevention of cerebrospinal fluid leakage after craniotomy: a systematic review, World Neurosurg. 118 (2018) 368-376.

(2) K. A. Grunzweig, M. Ascha, A. R. Kumar, Fibrin tissue sealant and minor skin grafts in burn surgery: A systematic review and meta-analysis, J. Plast. Reconstr. Aesthetic Surg. (2019).

(3) L. J. R. Foster, Bioadhesives as surgical sealants: A Review, Bioadhesion Biomim. Nat. Appl. 203 (2015).

(4) F. Scognamiglio, A. Travan, I. Rustighi, P. Tarchi, S. Palmisano, E. Marsich, M. Borgogna, I. Donati, N. de Manzini, S. Paoletti, Adhesive and sealant interfaces for general surgery applications, J. Biomed. Mater. Res. Part B Appl. Biomater. 104 (2016) 626-639.

(5) V. D. Plat, B. T. Bootsma, N. van der Wielen, J. Straatman, L. J. Schoonmade, D. L. van der Peet, F. Daams, The role of tissue adhesives in esophageal surgery, a systematic review of literature, Int. J. Surg. 40 (2017) 163-168.

(6) N. Annabi, K. Yue, A. Tamayol, A. Khademhosseini, Elastic sealants for surgical applications, Eur. J. Pharm. Biopharm. 95 (2015) 27-39.

(7) W. Zhu, Y. J. Chuah, D.-A. Wang, Bioadhesives for Internal Medical Applications: A Review, Acta Biomater. (2018).

(8) NBC29, Global Hemostats and Tissue Sealants market to grow at 8.03% of CAGR by 2027, (2019). https://www.nbc29.com/story/40159960/global-hemostats-and-tissue-sealants-market-to-grow-at-803-of-cagr-by-2027 (accessed Apr. 24, 2019).

(9) L. Han, K. Liu, M. Wang, K. Wang, L. Fang, H. Chen, J. Zhou, X. Lu, Mussel-Inspired Adhesive and Conductive Hydrogel with Long-Lasting Moisture and Extreme Temperature Tolerance, Adv. Funct. Mater. 28 (2018) 1704195.

(10) C. Ghobril, M. W. Grinstaff, The chemistry and engineering of polymeric hydrogel adhesives for wound closure: a tutorial, Chem. Soc. Rev. 44 (2015) 1820-1835.

(11) T. Chen, Y. Chen, H. U. Rehman, Z. Chen, Z. Yang, M. Wang, H. Li, H. Liu, Ultratough, Self-Healing, and Tissue-Adhesive Hydrogel for Wound Dressing, ACS Appl. Mater. Interfaces. 10 (2018) 33523-33531.

(12) J. A. Rousou, Use of fibrin sealants in cardiovascular surgery: a systematic review, J. Card. Surg. Incl. Mech. Biol. Support Hear. Lungs. 28 (2013) 238-247.

(13) M. Madaghiele, C. Demitri, A. Sannino, L. Ambrosio, Polymeric hydrogels for burn wound care: Advanced skin wound dressings and regenerative templates, Burn. Trauma. 2 (2014) 153.

(14) A. K. Saxena, Synthetic biodegradable hydrogel (PleuraSeal) sealant for sealing of lung tissue after thoracoscopic resection, J. Thorac. Cardiovasc. Surg. 139 (2010) 496-497.

(15) Y. Otani, Y. Tabata, Y. Ikada, Sealing effect of rapidly curable gelatin-poly (L-glutamic acid) hydrogel glue on lung air leak, Ann. Thorac. Surg. 67 (1999) 922-926.

(16) M. Araki, H. Tao, N. Nakajima, H. Sugai, T. Sato, S.-H. Hyon, T. Nagayasu, T. Nakamura, Development of new biodegradable hydrogel glue for preventing alveolar air leakage, J. Thorac. Cardiovasc. Surg. 134 (2007) 1241-1248.

(17) H. Kobayashi, T. Sekine, T. Nakamura, Y. Shimizu, In vivo evaluation of a new sealant material on a rat lung air leak model, J. Biomed. Mater. Res. An Off. J. Soc. Biomater. Japanese Soc. Biomater. Aust. Soc. Biomater. Korean Soc. Biomater. 58 (2001) 658-665.

(18) N. Annabi, Y.-N. Zhang, A. Assmann, E. S. Sani, G. Cheng, A. D. Lassaletta, A. Vegh, B. Dehghani, G. U. Ruiz-Esparza, X. Wang, Engineering a highly elastic human protein—based sealant for surgical applications, Sci. Transl. Med. 9 (2017) eaai7466.

(19) R. Wang, J. Li, W. Chen, T. Xu, S. Yun, Z. Xu, Z. Xu, T. Sato, B. Chi, H. Xu, A Biomimetic Mussel-Inspired ε-Poly-l-lysine Hydrogel with Robust Tissue-Anchor and Anti-Infection Capacity, Adv. Funct. Mater. 27 (2017) 1604894.

(20) E. S. Sani, A. Kheirkhah, D. Rana, Z. Sun, W. Foulsham, A. Sheikhi, A. Khademhosseini, R. Dana, N. Annabi, Sutureless repair of corneal injuries using naturally derived bioadhesive hydrogels, Sci. Adv. 5 (2019) eaav1281.

(21) M. W. Grinstaff, Designing hydrogel adhesives for corneal wound repair, Biomaterials. 28 (2007) 5205-5214.

(22) N. Monteiro, G. Thrivikraman, A. Athirasala, A. Tahayeri, C. M. França, J. L. Ferracane, L. E. Bertassoni, Photopolymerization of cell-laden gelatin methacryloyl hydrogels using a dental curing light for regenerative dentistry, Dent. Mater. 34 (2018) 389-399.

(23) M. Ducret, A. Montembault, J. Josse, M. Pasdeloup, A. Celle, R. Benchrih, F. Mallein-Gerin, B. Alliot-Licht, L. David, J.-C. Farges, Design and characterization of a chitosan-enriched fibrin hydrogel for human dental pulp regeneration, Dent. Mater. (2019).

(24) K. A. Fukushima, M. M. Marques, T. K. Tedesco, G. L. de Carvalho, F. Gonçalves, H. Caballero-Flores, S. Morimoto, M. S. Moreira, Screening of hydrogel-based scaffolds for dental pulp regeneration—A systematic review, Arch. Oral Biol. (2018).

(25) K. M. Galler, F. P. Brandl, S. Kirchhof, M. Widbiller, A. Eidt, W. Buchalla, A. Göpferich, G. Schmalz, Suitability of different natural and synthetic biomaterials for dental pulp tissue engineering, Tissue Eng. Part A. 24 (2018) 234-244.

(26) S. Kargozar, P. B. Milan, F. Baino, M. Mozafari, Nanoengineered biomaterials for bone/dental regeneration, in: Nanoeng. Biomater. Regen. Med., Elsevier, 2019: pp. 13-38.

(27) K. S. Vyas, S. P. Saha, Comparison of hemostatic agents used in vascular surgery, Expert Opin. Biol. Ther. 13 (2013) 1663-1672.

(28) K. Hirai, Y. Tabata, S. Hasegawa, Y. Sakai, Enhanced intestinal anastomotic healing with gelatin hydrogel incorporating basic fibroblast growth factor, J. Tissue Eng. Regen. Med. 10 (2016) E433-E442.

(29) D. J. Smith, G. A. Brat, S. H. Medina, D. Tong, Y. Huang, J. Grahammer, G. J. Furtmüller, B. C. Oh, K. J. Nagy-Smith, P. Walczak, A multiphase transitioning peptide hydrogel for suturing ultrasmall vessels, Nat. Nanotechnol. 11 (2016) 95.

(30) J. R. Soucy, E. Shirzaei Sani, R. Portillo Lara, D. Diaz, F. Dias, A. S. Weiss, A. N. Koppes, R. A. Koppes, N. Annabi, Photocrosslinkable gelatin/tropoelastin hydrogel adhesives for peripheral nerve repair, Tissue Eng. Part A. 24 (2018) 1393-1405.

(31) J.-Y. Sun, X. Zhao, W. R. K. Illeperuma, O. Chaudhuri, K. H. Oh, D. J. Mooney, J. J. Vlassak, Z. Suo, Highly stretchable and tough hydrogels, Nature. 489 (2012) 133.

(32) K. A. Vakalopoulos, Z. Wu, L. Kroese, G.-J. Kleinrensink, J. Jeekel, R. Vendamme, D. Dodou, J. F. Lange, Mechanical strength and rheological properties of tissue adhesives with regard to colorectal anastomosis: an ex vivo study., Ann. Surg. 261 (2015) 323-331. doi:10.1097/SLA.0000000000000599.

(33) D. G. Wallace, G. M. Cruise, W. M. Rhee, J. A. Schroeder, J. J. Prior, J. Ju, M. Maroney, J. Duronio, M. H. Ngo, T. Estridge, G. C. Coker, A tissue sealant based on reactive multifunctional polyethylene glycol., J. Biomed. Mater. Res. 58 (2001) 545-555.

(34) A. K. Dastjerdi, M. Pagano, M. T. Kaartinen, M. D. McKee, F. Barthelat, Cohesive behavior of soft biological adhesives: experiments and modeling., Acta Biomater. 8 (2012) 3349-3359. doi:10.1016/j.actbio.2012.05.005.

(35) K. Haraguchi, T. Takehisa, Nanocomposite Hydrogels: A Unique Organic-Inorganic Network Structure with Extraordinary Mechanical, Optical, and Swelling/Deswelling Properties, Adv. Mater. 14 (2002) 1120-1124. doi:10.1002/1521-4095(20020816)14:16<1120::AID-ADMA1120>3.0.CO;2-9.

(36) M. Moretti, D. Wendt, D. Schaefer, M. Jakob, E. B. Hunziker, M. Heberer, I. Martin, Structural characterization and reliable biomechanical assessment of integrative cartilage repair., J. Biomech. 38 (2005) 1846-1854. doi:10.1016/j.jbiomech.2004.08.021.

(37) A. G. Lake, G J; Thomas, The strength of highly elastic materials, Proc. R. Soc. London. Ser. A. Math. Phys. Sci. 300 (1967) 108 LP-119.

(38) D. C. Tuncaboylu, M. Sari, W. Oppermann, O. Okay, Tough and self-healing hydrogels formed via hydrophobic interactions, Macromolecules. 44 (2011) 4997-5005.

(39) J. P. Gong, Y. Katsuyama, T. Kurokawa, Y. Osada, Double-network hydrogels with extremely high mechanical strength, Adv. Mater. 15 (2003) 1155-1158.

(40) Q. M. Yu, Y. Tanaka, H. Furukawa, T. Kurokawa, J. P. Gong, Direct observation of damage zone around crack tips in double-network gels, Macromolecules. 42 (2009) 3852-3855.

(41) R. E. Webber, C. Creton, H. R. Brown, J. P. Gong, Large strain hysteresis and mullins effect of tough double-network hydrogels, Macromolecules. 40 (2007) 2919-2927.

(42) K. J. Henderson, T. C. Zhou, K. J. Otim, K. R. Shull, Ionically cross-linked triblock copolymer hydrogels with high strength, Macromolecules. 43 (2010) 6193-6201.

(43) M. A. Hague, T. Kurokawa, G. Kamita, J. P. Gong, Lamellar bilayers as reversible sacrificial bonds to toughen hydrogel: hysteresis, self-recovery, fatigue resistance, and crack blunting, Macromolecules. 44 (2011) 8916-8924.

(44) J. Li, A. D. Celiz, J. Yang, Q. Yang, I. Wamala, W. Whyte, B. R. Seo, N. V Vasilyev, J. J. Vlassak, Z. Suo, D. J. Mooney, Tough adhesives for diverse wet surfaces, Science (80-.). 357 (2017) 378 LP-381.

(45) A. I. Van Den Bulcke, B. Bogdanov, N. De Rooze, E. H. Schacht, M. Cornelissen, H. Berghmans, Structural and rheological properties of methacrylamide modified gelatin hydrogels, Biomacromolecules. 1 (2000) 31-38.

(46) J. W. Nichol, S. T. Koshy, H. Bae, C. M. Hwang, S. Yamanlar, A. Khademhosseini, Cell-laden microengineered gelatin methacrylate hydrogels, Biomaterials. 31 (2010) 5536-5544.

(47) E. E. Coates, C. N. Riggin, J. P. Fisher, Photocrosslinked alginate with hyaluronic acid hydrogels as vehicles for mesenchymal stem cell encapsulation and chondrogenesis, J. Biomed. Mater. Res.—Part A. (2013). doi:10.1002/jbm.a.34499.

(48) Z. Wang, Z. Tian, F. Menard, K. Kim, Comparative study of gelatin methacrylate hydrogels from different sources for biofabrication applications, Biofabrication. 9 (2017) 44101.

(49) A. Boddupalli, K. M. Bratlie, Collagen organization deposited by fibroblasts encapsulated in pH responsive methacrylated alginate hydrogels, J. Biomed. Mater. Res. Part A. 106 (2018) 2934-2943.

(50) ASTM F2392-04(2015), Standard Test Method for Burst Strength of Surgical Sealants, ASTM International, West Conshohocken, PA, www.astm.org, 2015.

(51) ASTM F2458-05(2015), Standard Test Method for Wound Closure Strength of Tissue Adhesives and Sealants, ASTM International, West Conshohocken, PA, www.astm.org, 2015.

(52) L. Li, Y. Fang, R. Vreeker, I. Appelqvist, E. Mendes, Reexamining the egg-box model in calcium-alginate gels with X-ray diffraction, Biomacromolecules. 8 (2007) 464-468.

All publications mentioned herein (e.g. the references numerically listed above, and U.S. Patent Publication 20180104059) are incorporated herein by reference to disclose and describe aspects, methods and/or materials in connection with the cited publications.

The invention claimed is:

1. A biocompatible composition of matter comprising:
    from 1% to 4% (w/v) of a physically and chemically crosslinkable alginate;
    from 10% to 30% (w/v) of a crosslinkable gelatin;
    divalent ions; and
    one or more visible light photoinitiators;
    wherein the physically and chemically crosslinkable alginate and the crosslinkable gelatin are chemically crosslinked together; and
    wherein the alginate has physical ionic crosslinks formed therein via the divalent ions.

2. The composition of claim 1, further comprising mammalian cells.

3. The composition of claim 1, wherein the one or more visible light photoinitiators comprise:
    1%-1.25% (w/v) vinylcaprolactam (VC),
    1.25%-1.875% (w/v) triethanolamine (TEA), and/or
    0.006%-0.0075% (w/v) Eosin Y.

4. The composition of claim 1, wherein the one or more visible light photoinitiators comprise:
    1%-1.25% (w/v) vinylcaprolactam (VC),
    1.25%-1.875% (w/v) triethanolamine (TEA), and
    0.006%-0.0075% (w/v) Eosin Y.

5. The composition of claim 1, wherein the one or more visible light photoinitiators comprise:
    1%-1.25% (w/v) vinylcaprolactam (VC), and
    1.25%-1.875% (w/v) triethanolamine (TEA).

6. The composition of claim 1, wherein the one or more visible light photoinitiators comprise N-vinylcaprolactam (VC), triethanolamine (TEA), and/or Eosin Y.

7. The composition of claim 6, wherein the one or more visible light photoinitiators comprise vinyl groups.

8. The composition of claim 6, wherein the ionic crosslinks are reversible.

9. The composition of claim 6 wherein the physically and chemically crosslinkable alginate and/or the crosslinkable gelatin comprise crosslinked moieties.

10. The composition of claim 8, wherein the composition comprises not more than 3% (w/v) of the physically and chemically crosslinkable alginate.

11. The composition of claim 10, wherein:
    there is 20% (w/v) of the crosslinkable gelatin;
    there is from 2% to 3% (w/v) of the physically and chemically crosslinkable alginate; and
    there is from 0.1% to 0.4% $CaCl_2$).

12. The composition of claim 11, wherein the composition:
    exhibits a tensile strength of at least 60, 70, 80 or 90 kPa;
    exhibits a toughness of at least 15, 20, 25 or 30 $KJ/m^3$; and/or
    exhibits a tensile strain of at least 0.6 or 0.7 mm/mm.

13. The composition of claim 11, further comprising:
    a pharmaceutical excipient selected from the group consisting of a preservative, a tonicity
    adjusting agent, a detergent, a viscosity adjusting agent, a sugar and/or a pH adjusting agent; and/or
    a therapeutic agent.

14. A method of making a composition of claim 13 comprising combining together the physically and chemically crosslinkable alginate and the crosslinkable gelatin, the one or more visible light photoinitiators, and a pharmaceutical excipient so as to form the composition.

15. The method of claim 14, wherein the composition is selected so that the composition:
    exhibits a tensile strength of at least 60, 70, 80 or 90 kPa;
    exhibits a toughness of at least 15, 20, 25 or 30 $KJ/m^3$; and/or
    exhibits a tensile strain of at least 0.6 or 0.7 mm/mm.

16. A method of delivering a composition of claim 13 to a preselected site comprising:
    disposing the composition at the site wherein the divalent ions include calcium ions;
    crosslinking the composition at the site in situ via exposing the composition to visible light for covalent crosslinking the physically and chemically crosslinkable alginate and the crosslinkable gelatin so that the physically and chemically crosslinkable alginate and the crosslinkable gelatin are chemically crosslinked together and subsequently exposing the composition to a calcium chloride ($CaCl_2$)) solution to facilitate $Ca^{2+}$ mediated physical bonding via ionic crosslinking at the site in situ for forming physical crosslinking within the physically and chemically crosslinkable alginate.

17. The method of claim 16, wherein the site comprises vascular, bladder, lung or heart tissue.

18. The method of claim 16, wherein:
    the physically and chemically crosslinkable alginate is from 2% to 3% (w/v) of the composition;
    the crosslinkable gelatin is 20% (w/v) of the composition; and
    the composition includes $CaCl_2$ that is from 0.13% to 0.4% (w/v) of the composition.

19. The method of claim 16, wherein the site is an in vivo site and the method also includes filling the site with Dulbecco's phosphate-buffered saline (DPBS) after the crosslinking of the composition occurs.

20. The method of claim 19, wherein the site is at an in vivo location where an individual has experienced trauma or injury.

* * * * *